US011953167B2

(12) United States Patent
Miskin

(10) Patent No.: US 11,953,167 B2
(45) Date of Patent: Apr. 9, 2024

(54) DEVICES AND SYSTEMS HAVING AC LED CIRCUITS AND METHODS OF DRIVING THE SAME

(71) Applicant: Lynk Labs, Inc., Elgin, IL (US)

(72) Inventor: Michael Miskin, Sleepy Hollow, IL (US)

(73) Assignee: Lynk Labs, Inc., Elgin, IL (US)

(*) Notice: Subject to any disclaimer, the term of this patent is extended or adjusted under 35 U.S.C. 154(b) by 0 days.

(21) Appl. No.: 16/378,314

(22) Filed: Apr. 8, 2019

(65) Prior Publication Data

US 2019/0306943 A1 Oct. 3, 2019

Related U.S. Application Data

(63) Continuation of application No. 15/632,906, filed on Jun. 26, 2017, now Pat. No. 10,257,892, which is a (Continued)

(51) Int. Cl.
*F21S 41/141* (2018.01)
*H05B 45/14* (2020.01)
(Continued)

(52) U.S. Cl.
CPC ............ *F21S 41/141* (2018.01); *H05B 45/14* (2020.01); *H05B 45/30* (2020.01); *H05B 45/42* (2020.01); *H05B 45/46* (2020.01); *H05B 45/48* (2020.01); *H05B 45/50* (2020.01); *H05B 45/58* (2020.01); *F21S 41/192* (2018.01); *F21S 43/14* (2018.01);
(Continued)

(58) Field of Classification Search
CPC ........ F21S 43/14; F21S 41/141; F21S 41/192; F21S 45/48; H05B 45/14; H05B 45/30; H05B 45/40; H05B 45/42; H05B 45/46; H05B 45/48; H05B 45/50; H05B 45/58; H05B 45/59; F21Y 2115/10
See application file for complete search history.

(56) References Cited

U.S. PATENT DOCUMENTS

| | | | |
|---|---|---|---|
| 3,582,932 | A | 6/1971 | Chapman |
| 3,712,706 | A | 1/1973 | Stamm |

(Continued)

FOREIGN PATENT DOCUMENTS

| | | |
|---|---|---|
| AU | 2003100206 | 4/2003 |
| AU | 2003100206 | 7/2003 |

(Continued)

OTHER PUBLICATIONS

International Search Report and Written Opinion for PCT application No. PCT/US2012/051531, 19 pages.

(Continued)

*Primary Examiner* — Abdullah A Riyami
*Assistant Examiner* — Syed M Kaiser
(74) *Attorney, Agent, or Firm* — K&L Gates LLP

(57) ABSTRACT

A lighting device and system having at least one circuit, the circuit having at least two LEDs connected in series, parallel or anti-parallel configuration and at least one current limiting diode. The device or system may be driven with AC or DC power and may further include a sensor and polarity switching circuit to utilize all LEDs within the circuit when drive by DC power.

20 Claims, 6 Drawing Sheets

Related U.S. Application Data continuation of application No. 14/886,252, filed on Oct. 19, 2015, now Pat. No. 9,693,405, which is a continuation of application No. 14/239,504, filed as application No. PCT/US2012/051531 on Aug. 20, 2012, now abandoned.

(60) Provisional application No. 61/575,273, filed on Aug. 18, 2011.

(51) Int. Cl.

| | |
|---|---|
| ***H05B 45/30*** | (2020.01) |
| ***H05B 45/42*** | (2020.01) |
| ***H05B 45/46*** | (2020.01) |
| ***H05B 45/48*** | (2020.01) |
| ***H05B 45/50*** | (2022.01) |
| ***H05B 45/58*** | (2020.01) |
| *F21S 41/19* | (2018.01) |
| *F21S 43/14* | (2018.01) |
| *F21S 45/48* | (2018.01) |
| *F21Y 115/10* | (2016.01) |
| *H05B 45/59* | (2022.01) |

(52) U.S. Cl.

CPC ............ *F21S 45/48* (2018.01); *F21Y 2115/10* (2016.08); *H05B 45/59* (2022.01)

(56) References Cited

U.S. PATENT DOCUMENTS 3,821,662 A 6/1974 Dewinter et al.
3,869,641 A 3/1975 Goldberg
3,981,023 A 9/1976 King et al.
4,104,562 A 8/1978 DiCola
4,145,655 A 3/1979 Caudel et al.
4,170,018 A 10/1979 Runge
4,218,627 A 8/1980 Kiesel
4,246,533 A 1/1981 Chiang
4,271,408 A 5/1981 Teshima et al.
4,298,869 A 11/1981 Okuno
4,298,896 A 11/1981 Okuno
4,350,973 A 9/1982 Petryk, Jr.
4,530,973 A 7/1985 Koster et al.
4,535,203 A 8/1985 Jenkins et al.
4,563,592 A 1/1986 Yuhasz et al.
4,573,766 A 3/1986 Bournay, Jr. et al.
4,653,895 A 3/1987 Deguchi et al.
4,654,880 A 3/1987 Sontag
4,646,398 A 4/1987 Michael et al.
4,656,398 A 4/1987 Michael et al.
4,691,341 A 9/1987 Knoble et al.
4,780,621 A 10/1988 Bartleucci et al.
4,797,651 A 1/1989 Havel
4,816,698 A 3/1989 Hook
RE33,285 E 7/1990 Kunen
4,962,347 A 10/1990 Burroughs et al.
5,010,459 A 4/1991 Taylor et al.
5,014,052 A 5/1991 Obeck
5,028,859 A 7/1991 Johnson et al.
5,086,294 A 2/1992 Kasegi
5,267,134 A 11/1993 Banayan
5,293,494 A 3/1994 Saito et al.
5,324,316 A 6/1994 Schulman et al.
5,353,213 A 10/1994 Paulik et al.
5,408,330 A 4/1995 Squicciarini et al.
5,430,609 A 7/1995 Kikinis
5,442,258 A * 8/1995 Shibata .................. H05B 45/37 315/129
5,457,450 A 10/1995 Deese et al.
5,463,280 A 10/1995 Johnson
5,469,020 A 11/1995 Herrick
5,519,263 A 5/1996 Santana, Jr.
5,521,652 A 5/1996 Shalvi
5,532,641 A 7/1996 Balasubramanian et al.
5,550,066 A 8/1996 Tang et al.
5,562,240 A 10/1996 Campbell
5,596,567 A 1/1997 DeMuro et al.
5,621,225 A 4/1997 Shieh et al.
5,636,303 A 6/1997 Che et al.
5,652,609 A 7/1997 Scholler et al.
5,657,054 A 8/1997 Files et al.
5,661,645 A 8/1997 Hochstein
5,663,719 A 9/1997 Deese et al.
5,684,738 A 11/1997 Au et al.
5,699,218 A 12/1997 Kadah
5,728,432 A 3/1998 Imashiro et al.
5,739,639 A 4/1998 Johnson
5,785,418 A 7/1998 Hochstein
5,790,013 A 8/1998 Hauck
5,790,106 A 8/1998 Hirano et al.
5,803,579 A 9/1998 Turnbull et al.
5,806,965 A 9/1998 Deese
5,828,768 A 10/1998 Eatwell et al.
5,847,507 A 12/1998 Butterworth et al.
5,874,803 A 2/1999 Garbuzov et al.
5,923,239 A 7/1999 Krueger et al.
5,936,599 A 8/1999 Reymond
5,946,348 A 8/1999 Mizutani et al.
5,963,012 A 10/1999 Garcia et al.
5,965,907 A 10/1999 Huang et al.
5,973,677 A 10/1999 Gibbons
5,982,103 A 11/1999 Mosebrook et al.
5,998,925 A 12/1999 Shimizu et al.
6,016,038 A 1/2000 Mueller et al.
6,019,493 A 2/2000 Kuo et al.
6,023,073 A 2/2000 Strite
6,028,694 A 2/2000 Schmidt
6,061,259 A 5/2000 DeMichele
6,072,475 A 6/2000 van Ketwich
6,078,148 A 6/2000 Hochstein
6,107,744 A 8/2000 Bavaro et al.
6,127,783 A 10/2000 Pashley et al.
6,164,368 A 12/2000 Furukawa et al.
6,184,628 B1 2/2001 Ruthenberg
6,211,626 B1 4/2001 Lys et al.
6,227,679 B1 5/2001 Zhang et al.
6,234,648 B1 5/2001 Borner
6,246,169 B1 6/2001 Pruvot
6,246,862 B1 6/2001 Grivas et al.
6,265,984 B1 7/2001 Molinaroli
6,292,901 B1 9/2001 Lys et al.
6,300,725 B1 10/2001 Zinkler et al.
6,300,748 B1 10/2001 Miller
6,303,238 B1 10/2001 Thompson et al.
6,307,757 B1 10/2001 Porter et al.
6,319,778 B1 11/2001 Chen et al.
6,323,652 B1 11/2001 Collier et al.
6,324,082 B1 11/2001 Keller
6,329,694 B1 12/2001 Lee et al.
6,357,889 B1 3/2002 Duggal et al.
6,361,886 B2 3/2002 Shi et al.
6,362,789 B1 3/2002 Trumbull et al.
6,380,693 B1 4/2002 Kastl
6,396,001 B1 5/2002 Nakamura
6,396,801 B1 5/2002 Upton et al.
6,404,131 B1 6/2002 Kawano et al.
6,411,045 B1 6/2002 Nerone
6,412,971 B1 7/2002 Wojnarowski et al.
6,439,731 B1 8/2002 Johnson et al.
6,441,558 B1 8/2002 Muthu et al.
6,456,481 B1 9/2002 Stevenson
6,466,198 B1 10/2002 Feinstein
6,489,724 B1 12/2002 Smith et al.
6,489,754 B2 12/2002 Blom
6,501,100 B1 12/2002 Srivastava et al.
6,507,159 B2 1/2003 Muthu
6,510,995 B2 1/2003 Muthu et al.
6,528,954 B1 3/2003 Lys et al.
6,529,126 B1 3/2003 Henry
6,541,800 B2 4/2003 Barnett
6,548,967 B1 4/2003 Dowling et al.
6,559,802 B2 5/2003 Goto et al.

(56) References Cited

U.S. PATENT DOCUMENTS 6,577,072 B2 6/2003 Saito et al.
6,580,228 B1 6/2003 Chen et al.
6,600,243 B1 7/2003 Hara et al.
6,614,103 B1 9/2003 Durocher et al.
6,618,042 B1 9/2003 Powell
6,633,120 B2 10/2003 Salam
6,636,003 B2 10/2003 Rahm et al.
6,636,005 B2 10/2003 Wacyk et al.
6,643,336 B1 11/2003 Hsieh
6,663,246 B2 12/2003 Currens et al.
6,664,744 B2 12/2003 Dietz
6,686,697 B2 2/2004 Cho et al.
6,689,626 B2 2/2004 Krijin et al.
6,714,348 B2 3/2004 Dunn
6,717,353 B1 4/2004 Mueller et al.
6,722,771 B1 4/2004 Stephens
6,774,582 B1 8/2004 Kwong et al.
6,781,329 B2 8/2004 Mueller et al.
6,781,570 B1 8/2004 Arrigo et al.
6,803,732 B2 10/2004 Kraus et al.
6,814,642 B2 11/2004 Siwinski et al.
6,832,729 B1 12/2004 Perry et al.
6,844,675 B2 1/2005 Yang
6,850,169 B2 2/2005 Manavi et al.
6,856,103 B1 2/2005 Hudson et al.
6,861,658 B2 3/2005 Fiset
6,879,319 B2 4/2005 Cok
6,879,497 B2 4/2005 Hua et al.
6,882,128 B1 4/2005 Rahmel et al.
6,891,786 B2 5/2005 Sato
6,907,089 B2 6/2005 Jensen et al.
6,936,936 B2 8/2005 Fischer et al.
6,949,772 B2 9/2005 Shimizu et al.
6,965,205 B2 11/2005 Piepgras et al.
6,988,053 B2 1/2006 Namaky
7,014,336 B1 3/2006 Ducharme et al.
7,019,662 B2 3/2006 Shackle
7,038,399 B2 5/2006 Lys et al.
7,044,627 B2 5/2006 Mertz et al.
7,064,498 B2 6/2006 Dowling et al.
7,161,590 B2 1/2007 Daniels
7,176,885 B2 2/2007 Troxell et al.
7,180,265 B2 2/2007 Naskali et al.
7,202,613 B2 4/2007 Morgan et al.
7,213,940 B1 5/2007 Van De Ven et al.
7,226,442 B2 6/2007 Sheppard, Jr. et al.
7,226,644 B2 6/2007 Sheppard, Jr. et al.
7,262,559 B2 8/2007 Tripathi et al.
7,264,378 B2 9/2007 Loh
7,271,568 B2 9/2007 Purdy et al.
7,288,902 B1 10/2007 Melanson
7,344,279 B2 3/2008 Mueller et al.
7,348,957 B2 3/2008 Cui et al.
7,375,476 B2 5/2008 Scott et al.
7,462,997 B2 12/2008 Mueller et al.
7,489,086 B2 2/2009 Miskin et al.
7,583,901 B2 9/2009 Nakagawa et al.
7,852,009 B2 12/2010 Coleman et al.
7,859,196 B2 12/2010 Lee et al.
RE42,161 E 2/2011 Hochstein
7,888,888 B2 2/2011 Huang et al.
8,055,310 B2 11/2011 Beart et al.
8,080,819 B2 12/2011 Mueller et al.
8,148,905 B2 4/2012 Miskin et al.
8,179,055 B2 5/2012 Miskin et al.
8,272,757 B1 9/2012 Fan et al.
8,314,571 B2 11/2012 Jonsson
8,326,225 B2 12/2012 Oba et al.
8,362,695 B2 1/2013 Aanegola et al.
8,373,363 B2 2/2013 Zdenko
8,400,081 B2 3/2013 Catalano et al.
8,471,495 B2 6/2013 Muguruma et al.
8,531,118 B2 9/2013 Miskin et al.
8,587,205 B2 11/2013 Ter Weeme et al.
8,648,539 B2 2/2014 Miskin et al.
8,766,548 B2 7/2014 Chew
8,841,855 B2 9/2014 Miskin
9,112,957 B2 9/2015 Beart et al.
9,184,497 B2 11/2015 Chen et al.
9,198,237 B2 11/2015 Miskin
9,615,420 B2 4/2017 Miskin
9,807,827 B2 10/2017 Miskin et al.
10,091,842 B2 10/2018 Miskin et al.
10,154,551 B2 12/2018 Miskin
10,178,715 B2 1/2019 Miskin et al.
10,349,479 B2 7/2019 Miskin et al.
10,492,251 B2 11/2019 Miskin et al.
10,492,252 B2 11/2019 Miskin et al.
10,499,466 B1 12/2019 Miskin et al.
10,506,674 B2 12/2019 Miskin et al.
10,517,149 B2 12/2019 Miskin et al.
10,537,001 B2 1/2020 Miskin et al.
10,575,376 B2 2/2020 Miskin et al.
10,687,400 B2 6/2020 Miskin et al.
10,750,583 B2 8/2020 Miskin
10,757,783 B2 8/2020 Miskin et al.
10,932,341 B2 2/2021 Miskin et al.
10,966,298 B2 3/2021 Miskin et al.
11,019,697 B2 5/2021 Miskin et al.
2001/0005319 A1 6/2001 Ohishi et al.
2001/0054005 A1 12/2001 Hook et al.
2002/0014630 A1 2/2002 Okazaki et al.
2002/0021573 A1 2/2002 Zhang
2002/0030193 A1 3/2002 Yamazaki et al.
2002/0030194 A1 3/2002 Camras et al.
2002/0048169 A1 4/2002 Dowling et al.
2002/0048177 A1 4/2002 Rahm et al.
2002/0060530 A1 5/2002 Sembhi et al.
2002/0070914 A1 6/2002 Bruning et al.
2002/0072395 A1 6/2002 Miramontes
2002/0080010 A1 6/2002 Zhang
2002/0081982 A1 6/2002 Schwartz et al.
2002/0086702 A1 7/2002 Lai et al.
2002/0113244 A1 8/2002 Barnett et al.
2002/0113246 A1 8/2002 Nagai et al.
2002/0118557 A1 8/2002 Ohlsson
2002/0130627 A1 9/2002 Morgan
2002/0137258 A1 9/2002 Akram
2002/0145392 A1 10/2002 Hair et al.
2002/0149572 A1 10/2002 Schulz et al.
2002/0158590 A1 10/2002 Saito et al.
2002/0163006 A1 11/2002 Sundar et al.
2002/0167016 A1 11/2002 Hoelen et al.
2002/0175870 A1 11/2002 Gleener
2002/0176259 A1 11/2002 Ducharme
2002/0181231 A1 12/2002 Luk
2002/0187675 A1 12/2002 McMullin et al.
2002/0191029 A1 12/2002 Gillespie et al.
2002/0195968 A1 12/2002 Sanford et al.
2003/0001657 A1 1/2003 Worley, Sr. et al.
2003/0011972 A1 1/2003 Koo
2003/0015968 A1 1/2003 Allen
2003/0020629 A1 1/2003 Swartz et al.
2003/0035075 A1 2/2003 Butler et al.
2003/0038291 A1 2/2003 Cao
2003/0043611 A1 3/2003 Bockle et al.
2003/0063462 A1 4/2003 Shimuzu et al.
2003/0072145 A1 4/2003 Nolan et al.
2003/0076306 A1 4/2003 Zadesky et al.
2003/0085621 A1 5/2003 Potega
2003/0085870 A1 5/2003 Hinckley
2003/0102810 A1 6/2003 Cross et al.
2003/0100837 A1 7/2003 Piepgras et al.
2003/0122502 A1* 7/2003 Clauberg ........... H05B 33/0818
315/291
2003/0137258 A1 7/2003 Piepgras et al.
2003/0144034 A1 7/2003 Hack et al.
2003/0146897 A1 8/2003 Hunter
2003/0156422 A1 8/2003 Tatewaki et al.
2003/0169014 A1 9/2003 Kadah
2003/0175004 A1 9/2003 Garito et al.
2003/0185005 A1 10/2003 Sommers et al.
2003/0219035 A1 11/2003 Schmidt
2003/0230934 A1 12/2003 Cordelli et al.

(56) References Cited

U.S. PATENT DOCUMENTS

2003/0231168 A1 12/2003 Bell et al.
2003/0234621 A1 12/2003 Kriparos
2004/0022058 A1 2/2004 Birrell
2004/0041620 A1 3/2004 D'Angelo et al.
2004/0080941 A1 4/2004 Jiang et al.
2004/0108997 A1 6/2004 Lee
2004/0130909 A1 7/2004 Mueller et al.
2004/0150994 A1 8/2004 Kazar et al.
2004/0164948 A1 8/2004 Kabel et al.
2004/0183380 A1 9/2004 Otake
2004/0189218 A1 9/2004 Leong et al.
2004/0201988 A1 10/2004 Allen
2004/0206970 A1 10/2004 Martin
2004/0207484 A1 10/2004 Forrester et al.
2004/0212321 A1 10/2004 Lys et al.
2004/0218387 A1 11/2004 Gerlach
2004/0263084 A1 12/2004 Mor et al.
2004/0264193 A1 12/2004 Okumura
2004/0266349 A1 12/2004 Wang
2005/0001225 A1 1/2005 Yoshimura et al.
2005/0058852 A1 3/2005 Tyan et al.
2005/0078093 A1 4/2005 Peterson, Jr. et al.
2005/0110426 A1 5/2005 Shao
2005/0111234 A1 5/2005 Martin et al.
2005/0116235 A1 6/2005 Schultz et al.
2005/0128751 A1 6/2005 Roberge et al.
2005/0158590 A1 7/2005 Li
2005/0173990 A1 8/2005 Anderson et al.
2005/0185401 A1 8/2005 Jiang et al.
2005/0195600 A1 9/2005 Porchia et al.
2005/0230600 A1* 10/2005 Olson ................ H05B 33/0827 250/214.1
2005/0231133 A1 10/2005 Lys
2005/0276053 A1 12/2005 Nortrup et al.
2006/0038542 A1 2/2006 Park et al.
2006/0091415 A1 5/2006 Yan
2006/0099994 A1 5/2006 Yang et al.
2006/0103913 A1 5/2006 Handschy et al.
2006/0138971 A1 6/2006 Uang et al.
2006/0158130 A1 7/2006 Furukawa
2006/0163589 A1 7/2006 Fan et al.
2006/0176692 A1 8/2006 Lee et al.
2006/0226795 A1 10/2006 Walter et al.
2006/0238136 A1 10/2006 Johnson, III et al.
2007/0024213 A1 2/2007 Shtenyberg et al.
2007/0063935 A1* 3/2007 Yoshida ................. G09G 3/325 345/76
2007/0069663 A1 3/2007 Burdalski et al.
2007/0159750 A1* 7/2007 Peker ..................... H05B 45/22 361/93.1
2007/0171145 A1 7/2007 Coleman et al.
2007/0258231 A1 11/2007 Koerner et al.
2007/0273299 A1* 11/2007 Miskin ............... H05B 33/0818 315/250
2007/0290625 A1 12/2007 He
2008/0062112 A1* 3/2008 Umezaki ............. G02F 1/13452 345/100
2008/0094005 A1 4/2008 Rabiner et al.
2008/0094837 A1 4/2008 Dobbins et al.
2008/0116816 A1 5/2008 Neuman et al.
2008/0116818 A1 5/2008 Shteynberg et al.
2008/0136347 A1 6/2008 Lin et al.
2008/0158915 A1 7/2008 Williams
2008/0203405 A1 8/2008 Rooymans
2008/0203936 A1 8/2008 Mariyama et al.
2008/0211416 A1* 9/2008 Negley ................... H01L 33/04 315/193
2008/0211421 A1* 9/2008 Lee ........................ H05B 45/42 315/250
2008/0218098 A1 9/2008 Lee et al.
2008/0218995 A1 9/2008 Gilkey
2008/0252197 A1 10/2008 Li et al.
2009/0009362 A1* 1/2009 Miller ................ H05B 33/0803 340/907
2009/0017433 A1 1/2009 Belsky et al.
2009/0021185 A1 1/2009 Ng
2009/0079357 A1* 3/2009 Shteynberg ............ H05B 45/37 315/291
2009/0079362 A1 3/2009 Shteynberg et al.
2009/0085500 A1* 4/2009 Zampini, II ........... H05B 45/00 315/297
2009/0160358 A1 6/2009 Slava
2009/0167202 A1 7/2009 Miskin et al.
2009/0174337 A1* 7/2009 Miskin ................... H05B 45/00 313/1
2009/0295300 A1 12/2009 King
2010/0039794 A1 2/2010 Ghanem et al.
2010/0109558 A1 5/2010 Chew
2010/0109564 A1 5/2010 Shin et al.
2010/0134038 A1 6/2010 Shackle
2010/0141153 A1* 6/2010 Recker ............... H05B 33/0803 315/149
2010/0141177 A1 6/2010 George
2010/0176746 A1* 7/2010 Catalano .................. G01K 7/01 315/297
2010/0224872 A1 9/2010 Kimura
2010/0259183 A1 10/2010 Leshniak
2010/0308738 A1 12/2010 Shteynberg et al.
2010/0311494 A1 12/2010 Miller et al.
2011/0057572 A1* 3/2011 Kit ......................... H05B 45/37 315/185 R
2011/0069094 A1* 3/2011 Knapp ................. G09G 3/3426 345/82
2011/0080110 A1* 4/2011 Nuhfer ............... H05B 33/0815 315/291
2011/0109228 A1* 5/2011 Shimomura ....... H05B 37/0245 315/113
2011/0115407 A1 5/2011 Wibben et al.
2011/0148327 A1 6/2011 Van de Ven et al.
2011/0156593 A1* 6/2011 De Greef ............... H05B 45/14 315/192
2011/0193484 A1 8/2011 Harbers et al.
2011/0210670 A1* 9/2011 Sauerlander ......... H05B 33/083 315/120
2011/0210678 A1* 9/2011 Grajcar .................. H05B 45/20 315/192
2011/0254034 A1 10/2011 Konsek et al.
2011/0273098 A1 11/2011 Grajcar
2011/0284822 A1 11/2011 Jung et al.
2011/0298393 A1 12/2011 Chew
2012/0043897 A1 2/2012 Miskin et al.
2012/0069560 A1 3/2012 Miskin et al.
2012/0075544 A1* 3/2012 Sasaki ............... G02F 1/133603 349/42
2012/0081009 A1 4/2012 Shteynberg et al.
2012/0081887 A1 4/2012 Burr et al.
2012/0161648 A1* 6/2012 Lin ........................ H05B 45/14 315/240
2012/0169231 A1* 7/2012 Dinc .................. H05B 33/0851 315/77
2012/0175643 A1 7/2012 West
2012/0262093 A1* 10/2012 Recker ................... H05B 47/19 315/307
2012/0268008 A1 10/2012 Miskin et al.
2012/0293083 A1 11/2012 Miskin et al.
2013/0051001 A1 2/2013 Miskin
2014/0049174 A1* 2/2014 Radermacher ......... H05B 45/37 315/200 R
2014/0153232 A1 6/2014 Miskin et al.
2014/0239809 A1 8/2014 Miskin
2014/0361697 A1 12/2014 Miskin et al.
2015/0091454 A1* 4/2015 McRae .................. H05B 45/20 315/200 R
2016/0095180 A1 3/2016 Miskin
2016/0143097 A1 5/2016 Miskin
2016/0188426 A1 6/2016 Kousha et al.
2017/0354005 A1 12/2017 Miskin et al.
2019/0045593 A1 2/2019 Miskin et al.
2019/0182919 A1 6/2019 Miskin et al.
2019/0268982 A1 8/2019 Miskin et al.

(56) References Cited

U.S. PATENT DOCUMENTS

| | | | |
|---|---|---|---|
| 2019/0306940 A1 | 10/2019 | Miskin et al. |
| 2019/0313491 A1 | 10/2019 | Miskin et al. |
| 2019/0350053 A1 | 11/2019 | Miskin et al. |

FOREIGN PATENT DOCUMENTS

| | | | |
|---|---|---|---|
| AU | 2003100206 | | 7/2013 |
| CN | 1341966 | A | 3/2002 |
| EP | 0515664 | | 12/1992 |
| EP | 1160883 | | 12/2001 |
| EP | 1 215 944 | | 6/2002 |
| EP | 1502483 | | 2/2005 |
| EP | 1 953 825 | B1 | 8/2008 |
| EP | 1953825 | | 8/2008 |
| EP | 1953825 | B1 | 7/2013 |
| GB | 2202414 | | 3/1987 |
| GB | 2202414 | | 9/1988 |
| GB | 2202414 | A | 9/1988 |
| GB | 2264555 | | 9/1993 |
| GB | 2372609 | | 8/2002 |
| IL | 123123 | | 3/2004 |
| JP | S6230386 | | 2/1987 |
| JP | 08-137429 | | 5/1996 |
| JP | H08149063 | | 6/1996 |
| JP | 11-016683 | | 1/1999 |
| JP | 11-330561 | | 11/1999 |
| JP | 2000030877 | | 1/2000 |
| JP | 200050512 | | 2/2000 |
| JP | 2000156526 | | 6/2000 |
| JP | 2000278383 | A | 10/2000 |
| JP | 2001004753 | A | 1/2001 |
| JP | 2001176677 | | 6/2001 |
| JP | 2001284065 | | 12/2001 |
| JP | 2002050798 | A | 2/2002 |
| JP | 2002057376 | | 2/2002 |
| JP | 2002208301 | A | 7/2002 |
| JP | 2003047177 | A | 2/2003 |
| JP | 2001291406 | | 4/2003 |
| JP | 2003298118 | | 10/2003 |
| JP | 2004-111104 | | 4/2004 |
| JP | 2004111104 | | 4/2004 |
| JP | 2005-524960 | | 8/2005 |
| JP | 2005222750 | | 8/2005 |
| JP | 2007059260 | | 3/2007 |
| JP | 3162876 | | 9/2010 |
| JP | 2011-040701 | | 2/2011 |
| JP | 2011159495 | | 8/2011 |
| KR | 100367215 | B1 | 1/2003 |
| KR | 20030073747 | A | 9/2003 |
| WO | 9750168 | | 12/1997 |
| WO | 1997050168 | | 12/1997 |
| WO | 9922338 | | 5/1999 |
| WO | 9939319 | | 8/1999 |
| WO | 0101385 | | 1/2001 |
| WO | 2001001385 | | 1/2001 |
| WO | 0215320 | | 2/2002 |
| WO | 0221741 | A1 | 3/2002 |
| WO | 0223956 | | 3/2002 |
| WO | 2002023956 | | 3/2002 |
| WO | WO02/23956 | | 3/2002 |
| WO | 0231406 | | 4/2002 |
| WO | 02062623 | | 8/2002 |
| WO | 03009535 | A1 | 1/2003 |
| WO | 03/026358 | | 3/2003 |
| WO | 2003019072 | | 3/2003 |
| WO | 03055273 | | 7/2003 |
| WO | 2004055654 | A2 | 7/2004 |
| WO | 2004094896 | | 11/2004 |
| WO | 2005084080 | | 9/2005 |
| WO | 2006023149 | | 3/2006 |
| WO | WO 2008124701 | | 10/2008 |
| WO | 2010016002 | | 2/2010 |
| WO | 2010138211 | | 2/2010 |
| WO | 2010035155 | | 4/2010 |
| WO | 2010103480 | | 9/2010 |
| WO | 2010126601 | | 11/2010 |
| WO | 20101266011 | | 11/2010 |
| WO | 2010138211 | | 12/2010 |
| WO | 20100138211 | | 12/2010 |
| WO | WO 2010138211 | | 12/2010 |
| WO | 2011082168 | | 7/2011 |
| WO | 2011/143510 | | 11/2011 |
| WO | 2011143510 | | 11/2011 |
| WO | 20110143510 | | 11/2011 |
| WO | 2013026053 | | 2/2013 |
| WO | 2013082609 | | 6/2013 |
| WO | WO 2013082609 | | 6/2013 |

OTHER PUBLICATIONS

*Samsung Electronics Co., Ltd.* v. *Lynk Labs, Inc.* U.S. Pat. No. 10,750,583, Petition for Inter Partes Review of U.S. Pat. No. 10,750,583 dated Oct. 28, 2021—79 pages.

*Samsung Electronics Co., Ltd.*, v. *Lynk Labs, Inc.* U.S. Pat. No. 10,750,583, Power of Attorney for Petitioner Samsung Electronics Co., Ltd.,—3 pages.

*Samsung Electronics Co., Ltd.*, v. *Lynk Labs, Inc.* U.S. Pat. No. 10,750,583, Petitioner's Notice Regarding Multiple Petitions—8 pages.

*Samsung Electronics Co., Ltd.*, v. *Lynk Labs, Inc.* Case: IPR2022-00100, U.S. Pat. No. 10,750,583, Patent Owner's Mandatory Notices Pursuant to 37 C.F.R Section 42.8—5 pages.

*Samsung Electronics Co., Ltd.*, v. *Lynk Labs, Inc.* U.S. Pat. No. 10,750,583, Declaration of R. Jacob Baker, Ph.D., P.E. In Support of Petition for Inter Partes Review of U.S. Pat. No. 10,750,583 Ex. 1002.

Baker CV, 37 pages—Ex. 1003.

U.S. Appl. No. 16/449,273, filed Jun. 21, 2019 Ex. 1004.

Sedra/Smith, "Microelectronic Circuits," Fourth Edition, Parts 1-4, pp. Exs. 1041, 1061, 1054, 1034.

Watson Mastering Electronics, Third Edition, pp. 1-151—Exs. 1012, 1018, 1031.

Tim Williams, The Circuit Designer's Companion, First Published 1991, ISBN 0 7506 1142 1, 314 pages—Ex. 1042, 1094.

Chamber Dictionary of Science and Technology, General Editor Professor Peter MB Walker, CBE, FRSE, Chambers Harrap Published Ltd. 1999 ISBN 0 550 14110 3, 4 pages—Ex. 1047, 1024.

McGraw-Hill Dictionary of Scientific and Technical Terms, Sixth Edition, Library of Congress Cataloging in Publication Data , ISBN 0-07-042313-X, pp. 4—Ex. 1048, 1018.

U.S. Appl. No. 61/333,963, filed May 12, 2010 Ex. 1063.

U.S. Appl. No. 61/284,927, filed Dec. 28, 2009 Ex. 1064.

U.S. Appl. No. 61/335,069, filed Dec. 31, 2009 Ex. 1065.

U.S. Appl. No. 60/997,771, filed Oct. 6, 2007 Ex. 1066.

U.S. Appl. No. 60/547,653, filed Mar. 2, 2004 Ex. 1067.

U.S. Appl. No. 60/559,867, filed Apr. 8, 2004 Ex. 1068.

U.S. Appl. No. 61/217,215, filed May 28, 2009 Ex. 1069.

U.S. Appl. No. 61/215,144, filed May 1, 2009 Ex. 1070.

"Supplemental Report of Parties' Planning Meeting", from *Samsung Electronics Co. Ltd. et al* v. *Lynk Labs, Inc.*, Case No. 1:21-cv-02665, filed Oct. 14, 2021—11 pages Ex. 1075, Ex. 1080.

Docket from *Samsung Electronics Co. Ltd. et al* v. *Lynk Labs, Inc.*, Case No. 1:21-cv-02665 printed Oct. 25, 2021—14 pages Ex. 1076, Ex. 1061.

Estimated Patent Case Schedule in Northern District of Illinois—2 pages Ex. 1079, Ex. 1062.

"Defendant Lynk Labs, Inc.'s Answer to Plaintiffs Samsung Electronics Co., Ltd. and Samsung Electronics America, Inc.'s First Amended Complaint and Counterclaims" from *Samsung Electronics Co. Ltd. et al* v. *Lynk Labs, Inc.*, Case No. 1:21-cv-02665, filed Aug. 3, 2021—67 pages Ex. 1082, Ex. 1071.

"Defendant Lynk Labs, Inc.'s Amended Preliminary Infringement Contentions" from *Samsung Electronics Co. Ltd. et al* v. *Lynk Labs, Inc.*, Case No. 1:21-cv-02665, filed Aug. 31, 2021—9 pages Ex. 1083, Ex. 1066.

U.S. Pat. No. 10,750,583 Exemplary Infringement Chart Samsung SmartThings Hub (as Appendix J-2)—11 pages Ex. 1084.

(56) References Cited

OTHER PUBLICATIONS

"Notification of Docket Entry" from *Samsung Electronics Co. Ltd. et al* v. *Lynk Labs, Inc.*, Case No. 1:21-cv-02665, filed Jul. 27, 2021—1 page Ex. 1085, Ex. 1068.
"Order" as scheduling order from *Samsung Electronics Co. Ltd. et al* v. *Lynk Labs, Inc.*, Case No. 1:21-cv-02665, filed Aug. 19, 2021—2 pages Ex. 1086.
"Notification of Docket Entry" from *Samsung Electronics Co. Ltd. et al* v. *Lynk Labs, Inc.*, Case No. 1:21-cv-02665, filed Oct. 18, 2021—1 page Ex. 1087, Ex. 1070.
"Defendant Lynk Labs, Inc.'s Supplement to Second Amended Preliminary Infringement Contentions ('551 Patent and 979 Patent)" from *Samsung Electronics Co. Ltd. et al* v. *Lynk Labs, Inc.*, Case No. 1:21-cv-02665, filed Sep. 22, 2021—20 pages Ex. 1072.
U.S. Pat. No. 10,966,298 (298 Patent)—Exhibit H-06—Mac Powerbook G3.
U.S. Pat. No. 10,966,298 (298 Patent)—Exhibit H-07—iPod G3.
U.S. Pat. No. 10,966,298 (298 Patent)—Exhibit H-08—iPAQ H5500.
U.S. Pat. No. 11,019,697 (697 Patent)—Exhibit I-01—Piepgrass.
U.S. Pat. No. 11,019,697 (697 Patent)—Exhibit I-02—Hitachi.
U.S. Pat. No. 11,019,697 (697 Patent)—Exhibit I-03—Mueller.
U.S. Pat. No. 11,019,697 (697 Patent)—Exhibit I-04—NEC.
U.S. Pat. No. 11,019,697 (697 Patent)—Exhibit I-05—Miskin '299.
U.S. Pat. No. 11,019,697 (697 Patent)—Exhibit I-06—Mac Powerbook G3.
U.S. Pat. No. 11,019,697 (697 Patent)—Exhibit I-07—iPod G3.
U.S. Pat. No. 11,019,697 (697 Patent)—Exhibit I-08—iPAQ H5500.
Macintosh PowerBook G3, 1999.
Apple iPod Third Generation User's Guide, released Apr. 29, 2003.
"HP iPAQ Pocket PC H5500," GadgetSpeak, published Nov. 6, 2003.
Light-Emitting Diodes by E. Fred Schubert, published in 2003 ("Schubert").
Fundamentals of LED Drivers by A. Hernandez et al., published in 2003 ("Hernandez").
Color System by Kinetics iColor MR Data Sheet.
WDS Wireless Dimming System Operator's Manual published in 2003 ("WDS-Manual").
AND8137/D—High Current LED—Isolated Low Voltage AC Drive—Application Note by Carl Walding, published in Oct. 2003 ("AND8137/D").
Characteristics of high-efficient InGaN-based white LED lighting by Yuji Uchida, published in 2011 ("Uchida").
Petition for Inter Partes Review, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 18, 2021.
Petitioners' Power of Attorney, *Home Depot USA, Inc.*, Petitioner, v. *Lynk Labs, Inc.*, Patent Owner, Case IPR2021-01369 U.S. Pat. No. 10,492,251, Issue Date Nov. 26, 2019, Title: "AC Light Emitting Diode and AC LED Drive Methods and Apparatus," 53 pages dated Aug. 17, 2021.
Declaration of Dr. Lebby U.S. Pat. No. 10,492,251dated Aug. 18, 2021, 134 pages—Ex 1002.
U.S. Appl. No. 16/148,945, filed Oct. 1, 2018—Ex. 1003.
Complaint for Patent Infringement, *Lynk Labs, Inc.* v. *Home Depot USA, Inc., The Home Depot Inc., and Home Depot Product Authority, LLC*, Case No. 6:21-cv-00097 dated Jan. 29, 2021, 88 pages—Ex. 1010.
Plaintiff Lynk Labs, Inc.'s Amended Preliminary Infringement Contentions, *Lynk Labs, Inc.* v. *Home Depot USA, Inc., The Home Depot Inc., and Home Depot Product Authority, LLC*, Case No. 6:21-cv-00097-ADA, dated Jun. 23, 2021, 7 pages—Ex. 1011.
Scheduling Order, *Lynk Labs, Inc.* v. *Home Depot USA, Inc., The Home Depot Inc., and Home Depot Product Authority, LLC*, Case No. 6:21-cv-00097-ADA, filed Aug. 13, 2021, 4 pages—Ex. 1012.
Petition for Inter Partes Review, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 52 pages dated Aug. 18, 2021.
Petitioners' Power of Attorney, *Home Depot USA, Inc.*, Petitioner, v. *Lynk Labs, Inc.*, Patent Owner, Case IPR2021-01370 U.S. Pat. No. 10,349,479, Issue Date Jul. 9, 2019, Title: "Color Temperature Controlled and Low THD LED Lighting Devices and Systems and Methods of Driving the Same," 2 pages dated Aug. 17, 2021.
Declaration of Dr. Dean Neikirk U.S. Pat. No. 10,349,479, Inter Partes Review No. IPR2021-01370, 98 pages—Ex 1002.
U.S. Appl. No. 15/369,218, filed Dec. 5, 2016, 617 pages—Ex 1003.
U.S. Appl. No. 61/630,025, filed Dec. 2, 2011, 39 pages—Ex 1011.
U.S. Appl. No. 61/570,200, filed Dec. 13, 2011, 51 pages—Ex 1012.
Complaint for Patent Infringement, Case No. 6:21-cv-00097, *Lynk Labs, Inc.* v. *Home Depot USA, Inc., The Home Depot Inc., and Home Depot Product Authority, LLC*, dated Jan. 29, 2021, 88 pages—Ex 1014.
Plaintiff Amended Preliminary Infringement Contentions, Lynk Lab's, Inc.'s, Case No. 6:21-cv-00097-ADA, *Lynk Labs, Inc.* v. *Home Depot USA, Inc., The Home Depot Inc., and Home Depot Product Authority, LLC*, dated Jun. 23, 2021, 7 pages—Ex 1015.
Scheduling Order, Case No. 6:21-cv-00097-ADA, *Lynk Labs, Inc.* v. *Home Depot USA, Inc., The Home Depot Inc., and Home Depot Product Authority, LLC*, filed Aug. 13, 2021, 4 pages—Ex 1016.
Petition for Inter Partes Review, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 93 pages dated Aug. 18, 2021.
Petitioners' Power of Attorney, *Home Depot USA, Inc.*, Petitioner, v. *Lynk Labs, Inc.*, Patent Owner, Case IPR2021-001367 U.S. Pat. No. 10,154,551, Issue Date Dec. 11, 2018, Title: "AC Light Emitting Diode and AC LED Drive Methods and Apparatus," 2 pages dated Aug. 17, 2021.
Declaration of Dr. Dean Neikirk—U.S. Pat. No. 10,154,551, Claims 1, 3, 4, 5, 7, 8—141 pages—Ex 1002.
U.S. Appl. No. 15/797,806—Now U.S. Pat. No. 10,154,551—Ex 1003.
U.S. Appl. No. 11/066,414—Now U.S. Pat. No. 7,489,086 issued Feb. 10, 2009—Ex 1005.
IEEE 100, The Authoritative Dictionary of IEEE Standards Terms—Seventh Edition, 3 pages—Ex 1010.
Complaint for Patent Infringement *Lynk Labs, Inc.* Plaintiff v. *Home Depot USA, Inc., The Home Depot Inc., and Home Depot Product Authority, LLC* Defendants, Case No. 6:21-cv-00097, filed Jan. 20, 2021—Ex. 1011.
Azazi et al., "Review of Passive and Active Circuits for Power Factor Correction in Single Phase, Low Power AC-DC Converters," Proceedings of the 14th International Middle East Power Systems Conference (MEPCON'10) Cairo University, Egypt, Dec. 19-21, 2010, Paper ID 154, 8 pages—Ex 1016.
U.S. Appl. No. 60/547,653, filed Feb. 25, 2004—Ex 1017.
U.S. Appl. No. 60/559,867, filed Feb. 25, 2004—Ex 1018.
U.S. Appl. No. 60/997,771, filed Oct. 6, 2007—Ex 1019.
U.S. Appl. No. 61/215,144, filed May 1, 2009—Ex 1022.
U.S. Appl. No. 61/217,215, filed May 28, 2009—Ex 1023.
U.S. Appl. No. 61/284,927, filed Dec. 28, 2009—Ex 1024.
U.S. Appl. No. 61/335,069, filed Dec. 31, 2009—Ex 1025.
U.S. Appl. No. 61/333,963, filed May 12, 2010—Ex 1026.
Plaintiff Lynk Labs, Inc.'s Amended Preliminary Infringement Contentions, Case No. 6:21-cv-00097-ADA filed Jun. 23, 2021, 7 pages—Ex 1034.
U.S. Appl. No. 60/379,079, filed May 9, 2002—Ex 1035.
U.S. Appl. No. 60/391,627, filed Jun. 26, 2002—Ex 1036.
Institute of Transportation Engineers Publication No. ST-017B, 1997 ISBN: 0-935403-16-7, ITE Specification (183369415.1), Chapter 2 Vehicle Traffic Control Signal Heads, 25 pages—Ex 1038.
Osorno, "Fourier Analysis of a Single-Phase Full Bridge Rectifier Using Matlab," California State University Northridge, 2002-774, 9 pages—Ex 1039.
Scheduling Order *Lynk Labs, Inc.* Plaintiff v. *Home Depot USA, Inc., The Home Depot Inc., and Home Depot Product Authority, LLC* Defendants, Case No. 6:21-cv-00097, filed Aug. 13, 2021—Ex. 1040.

(56) References Cited

OTHER PUBLICATIONS

Vachak et al., "Power Factor Correction Circuits: Active Filters," International Journal of Engineering Research and General Science, vol. 2, Issue 5, Aug.-Sep. 2014, ISSAN 2091-2730, 9 pages—Ex 1041.
*Home Depot USA, Inc.*, v. *Lynk Labs, Inc.* Case IPR2021-01540, U.S. Pat. No. 10,091,842—Declaration of Dr. Lebby; Issue Date Oct. 2, 2018—158 pages—Ex. 1002.
U.S. Appl. No. 15/334,029, filed Oct. 25, 2016—646 pages—Ex. 1003.
*Lynk Labs, Inc.* v. *Home Depot USA, Inc., The Home Depot Inc. and Home Depot Product Authority, LLC*, Case No. 6:21-cv-00097-ADA, Complaint for Patent Infringement filed Jan. 29, 2021—88 pages—Ex. 1004.
*Lynk Labs, Inc.* v. *Home Depot USA, Inc., The Home Depot Inc. and Home Depot Product Authority, LLC*, Case No. 6:21-cv-00097-ADA, Scheduling Order filed Aug. 13, 2021—4 pages—Ex. 1006.
Signalized Intersection Safety in Europe, Dec. 2003, Publication No. FHWA-PL-02-020, Office of International Programs; International @fhwa.dot.gov; www.international.fhwa.dot.gov—126 pages—Ex. 1010.
Ohno et al., "Traffic Light Queues with Departure Headway Depending Upon Positions," Kyoto University, J. Operations Research So. of Japan, vol. 17, No. 3, Sep. 1974—pp. 146-169—Ex. 1011.
U.S. Appl. No. 61/333,963, filed May 12, 2010—52 pages—Ex. 1021.
U.S. Appl. No. 61/284,927, filed Dec. 28, 2009—26 pages—Ex. 1022.
U.S. Appl. No. 61/335,069, filed Dec. 31, 2009—36 pages—Ex. 1023.
U.S. Appl. No. 60/997,771, filed Oct. 6, 2007—24 pages—Ex. 1024.
U.S. Appl. No. 60/547,653, filed Feb. 25, 2004—83 pages—Ex. 1025.
U.S. Appl. No. 60/559,867, filed Feb. 25, 2004—89 pages—Ex. 1026.
U.S. Appl. No. 61/217,215, filed May 28, 2009—32 pages—Ex. 1027.
U.S. Appl. No. 61/215,144, filed May 1, 2009—11 pages—Ex. 1028.
E. Fred Schubert, "Light Emitting Diodes," Rensselaer Polytechnic Institute, Cambridge University Press, 2002—327 page—Ex. 1030.
IEEE 100 The Authoritative Dictionary of IEEE Standards Terms, Seventh Edition—4 pages—Ex. 1032.
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 264 pages—Ex. 1005 (excerpts).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 100 pages—Ex. 1012 (Part 1).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 2).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 102 pages—Ex. 1012 (Part 3).
*Lynk Labs, Inc.* v. *Home Depot USA, Inc., The Home Depot Inc. and Home Depot Product Authority, LLC*, Case No. 6:21-cv-00097-ADA, Preliminary Lynk Labs, Inc.'s Amended Preliminary Infringement Contentions filed Jun. 23, 2021, 142 pages—Ex. 1012 (Part 4).
*Home Depot USA, Inc.*, v. *Lynk Labs, Inc.*, Case No. IPR2021-01540, U.S. Pat. No. 10,091,842, Petition for Inter Partes Review, Issue Date Oct. 2, 2018—74 pages.
*Home Depot USA, Inc.*, v. *Lynk Labs, Inc.*, Case No. IPR2021-01540, U.S. Pat. No. 10,091,842, Notice of Filing Date Accorded to Petition and Time for Filing Patent Owner Preliminary Response—dated Oct. 15, 2021—6 pages.
*Home Depot USA, Inc.*, v. *Lynk Labs, Inc.*, Case No. IPR2021-01540, U.S. Pat. No. 10,091,842, Petitioner's Power of Attorney, Issue Date Oct. 2, 2018—2 pages.
*Home Depot USA, Inc.*, v. *Lynk Labs, Inc.*, Case No. IPR2021-01540, U.S. Pat. No. 10,091,842, Patent Owner's Mandatory Notices Pursuant to 37 C.F.R. Section 42.8 filed Oct. 22, 2021—6 pages.
*Home Depot USA, Inc.*, v. *Lynk Labs, Inc.*, Case No. IPR2021-01541, U.S. Pat. No. 10,537,001, Declaration of Dr. Dena Neikirk, Filing Date Feb. 12, 2019, Issue Date Jan. 14, 2020.
U.S. Appl. No. 16/274,164, filed Feb. 12, 2019—543 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement Case dated Jan. 29, 2021—88 pages—Ex. 1011.
*Lynk Labs, Inc.*, v. *Home Depot USA, Inc., The Home Depot Inc., and Home Depot Product Authority, LLC*, Case No. 6:21-cv-00097-ADA, Scheduling Order filed Aug. 13, 2021—4 pages—Ex. 1013.
U.S. Appl. No. 61/217,215, filed May 28, 2009—32 pages—Ex. 1014.
U.S. Appl. No. 60/997,771, filed Oct. 6, 2007—24 pages—Ex. 1015.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,562,979, 10,757,783, and 10,932,341 filed Oct. 6, 2021—38 pages—Ex. 1019.
Response to Final Office Action U.S. Appl. No. 15/369,218, filed Jun. 13, 2018, 10 pages—Ex. 1020.
Non-Final Office Action U.S. Appl. No. 156/369,218 dated Oct. 2, 2018, 11 pages—Ex. 1021.
Non-Final Office Action U.S. Appl. No. 16/440,884 dated Jul. 23, 2019, 10 pages—Ex. 1023.
Continuation Application U.S. Appl. No. 16/369,218—original claims—Ex. 1024.
Response to Office Action U.S. Appl. No. 16/440,884, 11 pages—Ex. 1026.
*Home Depot USA, Inc.*, v. *Lynk Labs, Inc.*, Case No. IPR2021-01541, Filing Date Feb. 12, 2019, Issue Date Jan. 14, 2020, Petition for Inter Partes Review of U.S. Pat. No. 10,537,001 Under 35 U.S.C. Section 311-319 and 37 C.F.R. Section 42.1-100, et Seq., 82 pages.
*Home Depot USA, Inc.*, v. *Lynk Labs, Inc.*, Case No. IPR2021-01541, U.S. Pat. No. 10,537,001, Petitioner's Power of Attorney, Issue Date Jan. 14, 2020—2 pages.
*Home Depot USA, Inc.*, v. *Lynk Labs, Inc.*, Case No. IPR2021-01541, U.S. Pat. No. 10,537,001, Patent Owner's Mandatory Notices Pursuant to 37 C.F.R. Section 42.8 filed Nov. 10, 2021—6 pages.
*Samsung Electronics Co., Ltd.* v. *Lynk Labs, Inc.* U.S. Pat. No. 10,687,400, Declaration of R. Jacob Baker Ph.D., P.E. In Support of Petition for Inter Partes Review of U.S. Pat. No. 10,687,400 dated Nov. 5, 2021—177 pages Ex. 1002.
File History of U.S. Pat. No. 10,687,400 Parts 1-4 1181 pages Ex. 1004.
Watson Mastering Electronics, Third Edition, pp. 1-151—Ex. 1030, Ex. 1012, Ex. 1018, Ex. 1031.
Sedra/Smith, "Microelectronic Circuits," Fourth Edition, Parts 1-4, 515 pages Ex. 1034, Ex. 1041, Ex. 1061, Ex. 1054.
Chamber Dictionary of Science and Technology, General Editor Professor Peter MB Walker, CBE, FRSE, Chambers Harrap Published Ltd. 1999 ISBN 0 550 14110 3, 4 pages Ex. 1047, Ex. 1024.
McGraw-Hill Dictionary of Scientific and Technical Terms, Sixth Edition, Library of Congress Cataloging in Publication Data , ISBN 0-07-042313-X, pp. 4 Ex. 1048, Ex. 1018.
Docket from *Samsung Electronics Co., Ltd. et al* v. *Lynk Labs, Inc.* No. 1:21-cv-02665 printed Nov. 5, 2021—14 pages Ex. 1076.

(56) References Cited

OTHER PUBLICATIONS

"Defendant Lynk Labs, Inc.'s Preliminary Infringement Contentions" from *Samsung Electronics Co. Ltd. et al* v. *Lynk Labs, Inc.*, Case No. 1:21-cv-02665 filed Jul. 21, 2021—9 pages Ex. 1080.
U.S. Pat. No. 10,687,400 ("the '400 Patent") Exemplary Infringement Chart ACOM Round (US) as Appendix K-1—9 pages Exs. 1081, 1084.
"Order" from *Samsung Electronics Co. Ltd. et al* v. *Lynk Labs, Inc.*, Case No. 1:21-cv-02665, filed Aug. 19, 2021—2 pages Ex. 1086.
"Supplemental Report of Parties' Planning Meeting" from *Samsung Electronics Co. Ltd. et al* v. *Lynk Labs, Inc.*, Case No. 1:21-cv-02665, filed Oct. 14, 2021—11 pages Ex. 1087, Ex. 1075, Ex. 1080.
"Order" from *Samsung Electronics Co. Ltd. et al* v. *Lynk Labs, Inc.*, Case No. 1:21-cv-02665, filed Oct. 18, 2021—1 page Ex. 1088.
Tim Williams, The Circuit Designer's Companion, First Published 1991, ISBN 0 7506 1142 1, 314 pages—Ex. 1089, Ex. 1094.
*Samsung Electronics Co., Ltd.* v. *Lynk Labs, Inc.* U.S. Pat. No. 10,687,400, Petition for Inter Partes Review of U.S. Pat. No. 10,687,400 dated Nov. 12, 2021—96 pages.
*Samsung Electronics Co., Ltd.* v. *Lynk Labs, Inc.* U.S. Pat. No. 10,687,400, Power of Attorney for Petitioner Samsung Electronics Co., Ltd. dated Oct. 8, 2021—3 pages.
*Samsung Electronics Co., Ltd.* v. *Lynk Labs, Inc.* U.S. Pat. No. 10,687,400, Petitioner's Notice Regarding Multiple Petitions dated Nov. 12, 2021—9 pages.
*Samsung Electronics Co., Ltd.* v. *Lynk Labs, Inc.* U.S. Pat. No. 10,687,400, Patent Owner's Mandatory Notices Pursuant to 37 C.F.R. § 42.8 dated Nov. 19, 2021—5 pages.
*Samsung Electronics Co., Ltd.* v. *Lynk Labs, Inc.* Patent Owner—U.S. Pat. No. 10,154,551 Petition for Inter Partes Review of U.S. Pat. No. 10,154,551—90 pages.
*Samsung Electronics Co., Ltd.* v. *Lynk Labs, Inc.* Patent Owner—U.S. Pat. No. 10,154,551 Power of Attorney for Petitioner Samsung Electronics, Co., Ltd. U.S. Pat. No. 10,154,551—3 pages.
*Samsung Electronics Co., Ltd.* v. *Lynk Labs, Inc.* Patent Owner—U.S. Pat. No. 10,652,979 Petition for Inter Partes Review of U.S. Pat. No. 10,652,979—84 pages.
*Samsung Electronics Co., Ltd.* v. *Lynk Labs, Inc.* Patent Owner—U.S. Pat. No. 10,652,979 Power of Attorney for Petitioner Samsung Electronics, Co., Ltd. U.S. Pat. No. 10,652,979—3 pages.
*Samsung Electronics Co., Ltd.* v. *Lynk Labs, Inc.* Patent Owner—U.S. Pat. No. 10,154,551 Declaration of R. Jacob Baker, PH.D., P.E. In support of Petition For Inter Partes Review of U.S. Pat. No. 10,154,551—175 pages—Ex. 1002.
R. Jacob (Jake) Baker, Ph.D., P.E. CV—36 pages, Patents '252, '298, '466, '551, '674, '697, '979—Ex-1003.
File History U.S. Pat. No. 10,154,551 U.S. Appl. No. 15/797,806 dated Oct. 30, 2017—Ex. 1004.
Williams, Tim, "The Circuit Designer's Companion," 2021, 314 pages—(Parts 1 and 2), '551 Ex. 1013.
Chambers, Dictionary of Science and Technology, published Chambers Harrap Publishers Ltd 1999, 8 pages, '551—Ex. 1024.
*Samsung Electronics Co. Ltd. and Samsung Electronics America, Inc.* v. *Lynk Labs, Inc.* Defendant Lynk Labs, Inc.'s Supplement to Second Amended Preliminary Infringement Contentions ('551 Patent and '979 Patent), Case No. 1:21-cv-02665, filed Sep. 22, 2021, 14 pages—Ex. 1072.
*Lynk Labs, Inc.* v. *Samsung Electronics Co. Ltd. and Samsung Electronics America, Inc.* Case No. 6:21-cv-00526 Complaint for Patent Infringement filed May 25, 2021, '551 12 pages—Ex. 1074.
*Lynk Labs, Inc.* v. *Samsung Electronics Co. Ltd. and Samsung Electronics America, Inc.* Case No. 6:21-cv-00526 First Amended Complaint for Patent Infringement filed Jun. 9, 2021, 18 pages—Ex. 1075.
*Samsung Electronics Co. Ltd. and Samsung Electronics America, Inc.* v. *Lynk Labs, Inc. Samsung Electronics Co., Ltd. and Samsung Electronics America, Inc,'s* Second Amended Complaint for Declaratory Judgment of Non-Infringement, Case No. 1:21-cv-02665, filed Sep. 8, 2021, 44 pages—Ex. 1076.
*Samsung Electronics Co. Ltd. et al.* v. *Lynk Labs, Inc.* Civil Docket for Case #1:21-cv-02665 dated Sep. 27, 2021 '551 12 pages—Ex. 1077.
*Lynk Labs, Inc.* v. *Samsung Electronics Co. Ltd. et al.* Civil Docket for Case #6:21-cv-00526-ADA dated Sep. 27, 2021 '551 8 pages—Ex. 1078.
*Lynk Labs, Inc.* v. *Samsung Electronics Co. Ltd. et al.* Civil Docket for Case #1:21-cv-05126 dated Sep. 29, 2021 '551 8 pages—Ex. 1079.
*Lynk Labs, Inc.* v. *Samsung Electronics Co. Ltd. et al.* Case No. 6:21-cv-00526-ADS Order Granting Plaintiff Lynk Labs, Inc.'s Stipulation to Transfer '551 2 pages—Ex. 1080.
*Samsung Electronics Co., Ltd.* v. *Lynk Labs, Inc.* Patent Owner—U.S. Pat. No. 10,652,979 Declaration of R. Jacob Baker, PH.D., P.E. In support of Petition For Inter Partes Review of U.S. Pat. No. 10,652,979—174 pages—Ex. 1002.
McGraw-Hill Dictionary of Scientific and Technical Term, Sixth Edition, '979—9 pages—Ex. 1018.
Declaration of R. Jacob Baker. Ph.D., P.E. U.S. Pat. No. 10,154,551, Inter Partes Review of U.S. Pat. No. 10,154,551, 176 pages—Ex 1002.
*Samsung Electronics Co., Ltd.* v. *Lynk Labs, Inc.* U.S. Pat. No. 10,517,149 Petition for Inter Partes Review of U.S. Pat. No. 10,517,149, 98 pages.
*Samsung Electronics Co., Ltd.* v. *Lynk Labs, Inc.* U.S. Pat. No. 10,517,149 Power of Attorney for Petitioner Samsung Electronics Co., Ltd. 3 pages.
*Samsung Electronics Co., Ltd. et al.* v. *Lynk Labs, Inc.* Case IPR2022-00098, U.S. Pat. No. 10,4517,149 Notice of Filing Date Accorded to Petition, dated Nov. 23, 2021, 6 pages.
*Samsung Electronics Co., Ltd.* v. *Lynk Labs, Inc.* Case: IPR2022-00098, U.S. Pat. No. 10,517,149 Patent Owner's Mandatory Notices Pursuant to 37 C.F.R. Section 42.8, 5 pages.
*Samsung Electronics Co., Ltd.* v. *Lynk Labs, Inc.* U.S. Pat. No. 10,517,149 Declaration of R. Jacob Baker, Ph.D., P.E. In Support of Petition for Inter Partes Review of U.S. Pat. No. 10,517,149, 179 pages—Ex. 1002.
R. Jacob (Jake) Baker, Ph.D., P.E. CV, 37 pages—Ex. 1003.
File History of U.S. Pat. No. 10,517,149, 359 pages—Ex. 1004.
Watson Mastering Electronics, Third Edition, pp. 1-151—Ex. 1018.
PCT File History US/2010/62235, filed Dec. 28, 2010—Ex. 1039.
PCT File History US/2010/001597, filed May 28, 2010—Ex. 1043.
PCT File History US/2010/001269, filed Apr. 30, 2010—Ex. 1044.
U.S. Appl. No. 61/333,963, filed May 12, 2010—Ex. 1046.
U.S. Appl. No. 61/284,927, filed Dec. 28, 2009—Ex. 1047.
U.S. Appl. No. 60/335,963, filed Dec. 31, 2009—Ex. 1048.
U.S. Appl. No. 60/997,771, filed Oct. 6, 2007—Ex. 1049.
U.S. Appl. No. 60/547,653, filed Feb. 25, 2004—Ex. 1050.
U.S. Appl. No. 60/559,867, filed Feb. 25, 2004—Ex. 1051.
U.S. Appl. No. 61/217,215, filed May 28, 2009—Ex. 1052.
U.S. Appl. No. 61/215,144, filed May 1, 2009—Ex. 1053.
Civil Docket for Case# 6:21-cv-02665, Northern District of Illinois, Samsung Electronics. Co., Ltd., filed May 17, 2021, 14 pages—Ex. 1061.
US District Court for the Northern District of Illinois, Estimated Patent Case Schedule, 2 pages—Ex. 1062.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, Aug. 31, 2021 9 pages—Ex. 1066.
Sedra/Smith, "Microelectronic Circuits," Fourth Edition, Part 1 of 4, pp. 1-161—Ex. 1041, Ex. 1061, Ex. 1054.
Sedra/Smith, "Microelectronic Circuits," Fourth Edition, Part 2 of 4, pp. 162-1048 pages—Ex. 1041, Ex. 1061, Ex. 1054.
Sedra/Smith, "Microelectronic Circuits," Fourth Edition, Part 3 of 4, pp. 1049-1230 pages—Ex. 1041, Ex. 1061, Ex. 1054.
Sedra/Smith, "Microelectronic Circuits," Fourth Edition, Part 4 of 4, pp. 1231-1237 pages—Ex. 1041, Ex. 1061, Ex. 1054.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1066.

(56) References Cited

OTHER PUBLICATIONS

U.S. Pat. No. 10,517,149 ("the '149 Patent") Exemplary Infringement Contention Claim Charts, Appendix A-5 through I-3—Ex. 1067.
*Samsung Electronics Co., Ltd. et al.* v. *Lynk Labs, Inc.* Case No. 1:21-cv-02665, Notification of Docket Entry Jul. 27, 2021, 1 page—Ex. 1068.
*Samsung Electronics Co., Ltd. et al.* v. *Lynk Labs, Inc.* Case No. 1:21-cv-02665, Scheduling Order dated Aug. 19, 2021, 2 pages—Ex. 1069.
Civil Docket for Case# 6:21-cv-00097-ADA, Western District of Texas (Waco)—Lynk Labs, Inc. filed Jan. 29, 2001, 9 pages—Ex. 1074.
*Samsung Electronics Co., Ltd. et al.* v. *Lynk Labs, Inc.* Case No. 1:21-cv-02665, Notification of Docket Entry Oct. 18, 2021, 1 page—Ex. 1070.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1071.
*Lynk Labs, Inc.*, v. *Home Dept USA, Inc., The Home Depot Inc., and Home Depot Product Authority, LLC*, Case. No. 6:21-cv-00097, Complaint For Patent Infringement dated Jan. 29, 2021, 88 page—Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint For Patent Infringement dated Mar. 17, 2021, 94 pages—Ex. 1073.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1075.
Tim Williams, The Circuit Designer's Companion, First Published 1991, ISBN 0 7506 1142 1, 314 pages—Ex. 1094.
U.S. Appl. No. 61/333,963, filed May 12, 2010, 52 pages—IPR2021-01299 Ex 1036; IPR2021-10347 Ex 1055' IPR2021-01346 Ex 1036, IPR2021-01345 Ex 1037; IPR2021-01300 Ex 1036.
U.S. Appl. No. 61/284,927, filed Dec. 28, 2009, 54 pages—IPR2021-01299 Ex 1037; IPR2021-10347 Ex 1056; IPR2021-01346 Ex 1037, IPR2021-01345 Ex 1037; IPR2021-01300 Ex 1037.
U.S. Appl. No. 61/335,069, filed Dec. 31, 2009, 65 pages—IPR2021-01299 Ex 1038; IPR2021-10347 Ex 1057; IPR2021-01346 Ex 1038, IPR2021-01345 Ex 1038, IPR2021-01300 Ex 1038.
U.S. Appl. No. 60/997,771, filed Oct. 6, 2007, 26 pages—IPR2021-01299 Ex 1039; IPR2021-10347 Ex 1058; IPR2021-01346 Ex 1039, IPR2021-01345 Ex 1039; IPR2021-01300 Ex 1039.
U.S. Appl. No. 60/547,653, filed Feb. 25, 2004, 84 pages—IPR2021-01299 Ex 1040; IPR2021-10347 Ex 1059; IPR2021-01346 Ex 1040, IPR2021-01345 Ex 1040; IPR2021-01300 Ex 1040.
U.S. Appl. No. 60/559,867, filed Feb. 25, 2004, 90 pages—IPR2021-01299 Ex 1041; IPR2021-10347 Ex 1060; IPR2021-01346 Ex 1041, IPR2021-01345 Ex 1041; IPR2021-01300 Ex 1041.
U.S. Appl. No. 61/217,215, filed May 28, 2008, 47 pages—IPR2021-01299 Ex 1042; IPR2021-10347 Ex 1061; IPR2021-01346 Ex 1042, IPR2021-01345 Ex 1042; IPR2021-01300 Ex 1042.
U.S. Appl. No. 61/215,144, filed May 1, 2009, 11 pages—IPR2021-01299 Ex 1043; IPR2021-10347 Ex 1062; IPR2021-01346 Ex 1043, IPR2021-01345 Ex 1043; IPR2021-01300 Ex 1043.
Watson, John, Mastering Electonics, Third Ed., McGraw Hill Inc., published in 1990—IPR2021-01299 Ex 1080; IPR2021-10347 Ex 1026; IPR2021-01346 Ex 1062; IPR2021-01345 Ex 1060; IPR2021-01300 Ex 1006.
Sedra, A., et al., Microelectronic Circuits, Fourth Ed., Oxford University Press, published in 1998—IPR2021-01299 Ex 1081; IPR2021-10347 Ex 1027; IPR2021-01346 Ex 1063; IPR2021-01345 Ex 1061 (4 parts); IPR2021-01300 Ex 1007.
Compaq Comp. Corp. et al., Universal Serial Bus Specification Revision 2.0 published in 2000, 650 pages—IPR2021-01299 Ex 1091; IPR2021-10347 Ex 1095; IPR2021-01346 Ex 1069; IPR2021-01345 Ex 1072; IPR2021-01300 Ex 1055.
Declaration of R. Jacob Baker. Ph.D., P.E. U.S. Pat. No. 10,966,298, Inter Partes Review No. IPR2021-01347, 152 pages—Ex 1002.
Gilbisco, Stan, Handbook of Radio & Wireless Technology, published in 1999, 188 pages, McGraw-Hill—IPR2021-10347 Ex 1013.
Petition for Inter Partes Review, *Samsung Electronics Co., Ltd.*, Petitioner, v. *Lynk Labs, Inc.*, Patent Owner, Case IPR2021-01347 U.S. Pat. No. 10,966,298, Issue Date Dec. 3, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc.*, Patent Owner, Case IPR2021-01346 U.S. Pat. No. 10,499,466, Issue Date Dec. 10, 2019, Title: "AC Light Emitting Diode and AC LED Drive Methods and Apparatus," 70 pages dated Sep. 7, 2021.
Petition for Inter Partes Review, *Samsung Electronics Co., Ltd.*, Petitioner, v. *Lynk Labs, Inc.*, Patent Owner, Case IPR2021-01345 U.S. Pat. No. 10,492,252, Issue Date Nov. 26, 2019, Title: "AC Light Emitting Diode and AC LED Drive Methods and Apparatus," 65 pages dated Sep. 7, 2021.
Petition for Inter Partes Review, *Samsung Electronics Co., Ltd.*, Petitioner, v. *Lynk Labs, Inc.*, Patent Owner, Case IPR2021-01300 U.S. Pat. No. 11,019,697, Issue Date May 25, 2019, Title: "AC Light Emitting Diode and AC LED Drive Methods and Apparatus," 71 pages dated Sep. 7, 2021.
Petition for Inter Partes Review, *Samsung Electronics Co., Ltd.*, Petitioner, v. *Lynk Labs, Inc.*, Patent Owner, Case IPR2021-01299 U.S. Pat. No. 10,506,674, Issue Date Dec. 10, 2019, Title: "AC Light Emitting Diode and AC LED Drive Methods and Apparatus," 70 pages dated Sep. 7, 2021.
Plaintiff's First Amended Complaint for Patent Infringement, Case No.6:21-cv-00526-ADA, *Lynk Labs, Inc.* v. *Samsung ElectronicsCo., Ltd. and Samsung Electronics America, Inc.* dated Jun. 9, 2021, 18 pages—IPR2021-01346 Ex 1080, IPR2021-01345 Ex 1056; IPR2021-01300 Ex 1086.
Defendant's Preliminary Infringement Contentions, Case No. 1:21-cv-2655, *Samsung Electronics Co., Ltd. and Samsung Electronics America, Inc.* v. *Lynk Labs, Inc.*, dated Jul. 21, 2021, 9 pages—IPR2021-01346 Ex 1081, IPR2021-01345 Ex 1057, IPR2021-01300 Ex 1080.
Defendant's Answer and Counterclaims, Case No. 1:21-cv-2665, *Samsung Electronics Co., Ltd. and Samsung Electronics America, Inc.* v. *Lynk Labs, Inc.*, dated Aug. 3, 2021, 67 pages—IPR2021-01346 Ex 1083, IPR2021-01345 Ex 1077, IPR2021-01300 Ex 1082.
Defendant's Amended Preliminary Infringement Contentions, Case No. 1:21-cv-2665, *Samsung Electronics Co., Ltd. and Samsung Electronics America, Inc.* v. *Lynk Labs, Inc.*, dated Aug. 31, 2021, 9 pages—IPR2021-01346 Ex 1086; IPR2021-01345 Ex 1086; IPR2021-01300 Ex 1087.
Scheduling Order, Case No. 1:21-cv-2665, *Samsung Electronics Co., Ltd. and Samsung Electronics America, Inc.* v. *Lynk Labs, Inc.*, dated Aug. 19, 2021—IPR2021-01346 Ex 1085, IPR2021-01345 Ex 1085, IPR2021-01300 Ex 1084.
Notification of Docket Entry, Case No. 1:21-cv-2665, *Samsung Electronics Co., Ltd. and Samsung Electronics America, Inc.* v. *Lynk Labs, Inc.*, dated Jul. 27, 2021, 1 page—IPR2021-01346 Ex 1084, IPR2021-01345 Ex 1084, IPR2021-01300 Ex 1083.
Declaration of R. Jacob Baker. Ph.D., P.E. U.S. Pat. No. 10,499,466, 187 pages, Inter Partes Review No. IPR2021-01346—Ex 1002.
Declaration of R. Jacob Baker. Ph.D., P.E. U.S. Pat. No. 10,492,252, 148 pages, Inter Partes Review No. IPR2021-01345—Ex 1002.
Declaration of R. Jacob Baker. Ph.D., P.E. U.S. Pat. No. 11,019,697, 261 pages, Inter Partes Review No. IPR2021-01300—Ex 1002.
Declaration of R. Jacob Baker. Ph.D., P.E. U.S. Pat. No. 10,506,674, 172 pages, Inter Partes Review No. IPR2021-01299—Ex 1002.
Declaration of R. Jacob Baker. Ph.D., P.E. U.S. Pat. No. 10,999,298, 152 pages, Inter Partes Review No. IPR2021-01347—Ex 1002.
Plaintiff's Complaint, Case No. 1:21-cv-2665, *Lynk Labs, Inc.* v. *Samsung Electronics Co., Ltd. and Samsung Electronics America, Inc.*, dated May 25, 2021, 12 pages—IPR2021-01300 Ex 1074.

(56) References Cited

OTHER PUBLICATIONS

Plaintiff's First Amended Complaint, Case No. 1:21-cv-2665, *Samsung Electronics Co., Ltd. and Samsung Electronics America, Inc.* v. *Lynk Labs, Inc.*, dated May 25, 2021, 33 pages—IPR2021-01300 Ex 1075.
Plaintiff's Complaint, Case No. 1:21-cv-2665, *Samsung Electronics Co., Ltd. and Samsung Electronics America, Inc.* v. *Lynk Labs, Inc.*, dated May 17, 2021, 30 pages—IPR2021-01300 Ex 1076.
The Microarchitecture of the Pentium 4 Processor by Hinton et al., published in 2001, 13 pages—IPR2021-01300 Ex 1017.
Wireless Medium Access Control (MAC) and Physical Layer (PHY) Specifications for Wireless Personal Area Networks (WPANs) by IEEE Computer Society, 1018 IEEE 812.15.1, published in 2002, 1168 pages—IPR2021-01300 Ex 1018.
*Samsung Electronics Co., Ltd.*, v. *Lynk Labs, Inc.* Patent Owner—Power of Attorney for Petitioner Samsung Electronics Co., Ltd. U.S. Pat. No. 10,492,252, dated Jul. 21, 2021—3 pages.
*Samsung Electronics Co., Ltd.*, v. *Lynk Labs, Inc.*, Case IPR2021-01345 , U.S. Pat. No. 10,492,252—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01345 , U.S. Pat. No. 10,492,252—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 10,966,298 dated Jul. 21, 2021—3 pages.
*Samsung Electronics Co., Ltd.*, v. *Lynk Labs, Inc.*, Case IPR2021-01347, U.S. Pat. No. 10,966,298—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01347 , U.S. Pat. No. 10,966,298—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 10,499,466 dated Jul. 21, 2021—3 pages.
*Samsung Electronics Co., Ltd.*, v. *Lynk Labs, Inc.*, Case IPR2021-01346, U.S. Pat. No. 10,499,466—Notice of Filing Date Accorded to Petition and Time for Filing Patent Owner Preliminary Response filed Sep. 7, 2021—5 pages.
*Samsung Electronics Co., Ltd.*, v. *Lynk Labs, Inc.*, Case IPR2021-01346 , U.S. Pat. No. 10,499,466—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.* Patent Owner—Power of Attorney for Petitioner Samsung Electronics Co., Ltd. U.S. Pat. No. 11,019,697 dated Jul. 21, 2021—3 pages.
*Samsung Electronics Co., Ltd.*, v. *Lynk Labs, Inc.*, Case IPR2021-01300, U.S. Pat. No. 11,019,697—Notice of Filing Date Accorded to Petition and Time for Filing Patent Owner Preliminary Response filed Sep. 7, 2021—6 pages.
*Samsung Electronics Co., Ltd.*, v. *Lynk Labs, Inc.*, Case IPR2021-01300 , U.S. Pat. No. 11,019,697—Patent Owner's Mandatory Notices Pursuant to 37 C.F.R. Section 42.8—dated Sep. 28, 2021—5 pages.
*Samsung Electronics Co., Ltd.*, v. *Lynk Labs, Inc.*, Case IPR2021-01300 , U.S. Pat. No. 11,019,697—Petitioner's Response to Notice of Filing Date Accorded To Petition and Time for Filing Patent Owner Preliminary Response (Paper No. 3) dated Sep. 20, 2021—3 pages.
*Samsung Electronics Co., Ltd.*, v. *Lynk Labs, Inc.*, Case IPR2021-01300 , U.S. Pat. No. 11,019,697—Notice of Accepting Corrected Petition filed Sep. 20, 2021—2 pages.
*Samsung Electronics Co., Ltd.*, v. *Lynk Labs, Inc.* Patent Owner—Power of Attorney for Petitioner Samsung Electronics Co., Ltd. U.S. Pat. No. 10,506,674 dated Jul. 21, 2021—3 pages.
*Samsung Electronics Co., Ltd.*, v. *Lynk Labs, Inc.*, Case IPR2021-01299, U.S. Pat. No. 10,506,674—Notice of Filing Date Accorded to Petition and Time for Filing Patent Owner Preliminary Response filed Sep. 7, 2021—6 pages.
*Samsung Electronics Co. Ltd. and Samsung Electronics America, Inc.* v. *Lynk Labs, Inc.* Case No. 1:21-cv-02665, Samsung's Initial Non-Infringement, Unenforceability, and Invalidity Contentions dated Sep. 21, 2021—85 pages.
U.S. Pat. No. 10,492,251 (251 Patent)—Exhibit A-01—Lys '262.
U.S. Pat. No. 10,492,251 (251 Patent)—Exhibit A-02—KR '747.
U.S. Pat. No. 10,492,251 (251 Patent)—Exhibit A-03—KR '215.
U.S. Pat. No. 10,492,251 (251 Patent)—Exhibit A-04—iColor System.
U.S. Pat. No. 10,492,251 (251 Patent)—Exhibit A-05—Miskin '299.
U.S. Pat. No. 10,492,252 (252 Patent)—Exhibit B-01—Piepgrass.
U.S. Pat. No. 10,492,252 (252 Patent)—Exhibit B-02—Hitachi.
U.S. Pat. No. 10,492,252 (252 Patent)—Exhibit B-03—Mueller.
U.S. Pat. No. 10,492,252 (252 Patent)—Exhibit B-04—NEC.
U.S. Pat. No. 10,492,252 (252 Patent)—Exhibit B-05—Miskin '299.
U.S. Pat. No. 10,492,252 (252 Patent)—Exhibit B-06—Mac Powerbook G3.
U.S. Pat. No. 10,492,252 (252 Patent)—Exhibit B-07—iPod G3.
U.S. Pat. No. 10,492,252 (252 Patent)—Exhibit B-08—iPAQ H5500.
U.S. Pat. No. 10,499,466 (466 Patent)—Exhibit C-01—Piepgrass.
U.S. Pat. No. 10,499,466 (466 Patent)—Exhibit C-02—HItachi.
U.S. Pat. No. 10,499,466 (466 Patent)—Exhibit C-03—Mueller.
U.S. Pat. No. 10,499,466 (466 Patent)—Exhibit C-04—NEC.
U.S. Pat. No. 10,499,466 (466 Patent)—Exhibit C-05—Miskin '299.
U.S. Pat. No. 10,499,466 (466 Patent)—Exhibit C-06—Mac Powerbook G3.
U.S. Pat. No. 10,499,466 (466 Patent)—Exhibit C-07—iPod G3.
U.S. Pat. No. 10,499,466 (466 Patent)—Exhibit C-08—iPAQ H5500.
U.S. Pat. No. 10,506,674 (674 Patent)—Exhibit D-01—Piepgrass.
U.S. Pat. No. 10,506,674 (674 Patent)—Exhibit D-02—Hitachi.
U.S. Pat. No. 10,506,674 (674 Patent)—Exhibit D-03—Mueller.
U.S. Pat. No. 10,506,674 (674 Patent)—Exhibit D-04—NEC.
U.S. Pat. No. 10,506,674 (674 Patent)—Exhibit D-05—Miskin '299.
U.S. Pat. No. 10,506,674 (674 Patent)—Exhibit D-06—Mac Powerbook G3.
U.S. Pat. No. 10,506,674 (674 Patent)—Exhibit D-07—iPod G3.
U.S. Pat. No. 10,506,674 (674 Patent)—Exhibit D-08—iPAQ H5500.
U.S. Pat. No. 10,517,149 (149 Patent)—Exhibit E-01—Lys '626.
U.S. Pat. No. 10,517,149 (149 Patent)—Exhibit E-02—KR '747.
U.S. Pat. No. 10,517,149 (149 Patent)—Exhibit E-03—KR '215.
U.S. Pat. No. 10,517,149 (149 Patent)—Exhibit E-04—iColor System.
U.S. Pat. No. 10,517,149 (149 Patent)—Exhibit E-05—Miskin '299.
U.S. Pat. No. 10,687,400 (400 Patent)—Exhibit F-01—Lys '626.
U.S. Pat. No. 10,687,400 (400 Patent)—Exhibit F-02—KR '747.
U.S. Pat. No. 10,687,400 (400 Patent)—Exhibit F-03—CK LEDs.
U.S. Pat. No. 10,687,400 (400 Patent)—Exhibit F-04—Miskin '299.
U.S. Pat. No. 10,750,583 (583 Patent)—Exhibit G-01—Lys '626.
U.S. Pat. No. 10,750,583 (583 Patent)—Exhibit G-02—KR 747.
U.S. Pat. No. 10,750,583 (583 Patent)—Exhibit G-03—KR 215.
U.S. Pat. No. 10,750,583 (583 Patent)—Exhibit G-04—iColor System.
U.S. Pat. No. 10,750,583 (583 Patent)—Exhibit G-05—Piepgrass.
U.S. Pat. No. 10,750,583 (583 Patent)—Exhibit G-06—Miskin '299.
U.S. Pat. No. 10,966,298 (298 Patent)—Exhibit H-01—Piepgrass.
U.S. Pat. No. 10,966,298 (298 Patent)—Exhibit H-02—Hitachi.
U.S. Pat. No. 10,966,298 (298 Patent)—Exhibit H-03—Mueller.
U.S. Pat. No. 10,966,298 (298 Patent)—Exhibit H-04—NEC.
U.S. Pat. No. 10,966,298 (298 Patent)—Exhibit H-05—Miskin '299.

(56) References Cited

OTHER PUBLICATIONS

*Home Depot U.S.A., Inc.* v. *Lynk Labs, Inc.* Case IPR 2022-00023 U.S. Pat. No. 10,517,149, Issue Date Dec. 24, 2019, Declaration of Dr. Lebby dated Oct. 20, 2021, 157 pages—Ex. 1002.
*Lynk Labs, Inc.*, v. *Home Depot USA, Inc., The Home Dept Inc., and Home Depot Product Authority, LLC* Case No. 6:21-cv-00097-ADA Scheduling Order filed Aug. 13, 2021, 4 pages—Ex. 1003.
*Lynk Labs, Inc.*, v. *Home Depot USA, Inc., The Home Dept Inc., and Home Depot Product Authority, LLC* Case No. 6:21-cv-00097 Complaint for Patent Infringement dated Jan. 29, 2021, 88 pages—Ex. 1004.
*Lynk Labs, Inc.*, v. *Home Depot USA, Inc., The Home Dept Inc., and Home Depot Product Authority, LLC* Case No. 6:21-cv-00097-ADA Plaintiff Lynk Labs, Inc,'s Amended Preliminary Infringement Contentions '149 Patent dated Jun. 23, 2021, 154 pages—Ex. 1005.
U.S. Appl. No. 16/215,502, filed Dec. 10, 2018, 359 pages—Ex. 1006.
IEEE 100 The Authoritative Dictionary of IEEE Standards Terms, Seventh Edition, Published by Standards Informaiton Network IEEE Press, pp. 1-4—Ex. 1007.
*Lynk Labs, Inc.* v. *Home Depot USA, Inc., The Home Dept Inc., and Home Depot Product Authority, LLC* Case No. 6:21-cv-00097-ADA Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783 and 10,932,341 filed Oct. 6, 2021, 38 pages—Ex. 1015.
U.S. Appl. No. 16/274,164, filed Feb. 12, 2019, 543 pages—Ex. 1016.
Heat Sink, Merriam-Webster; Examples of heat sink in a sentence, http://wwwmerriam-webster.com/dictionary/heat%20sink, 7 pages—Ex. 1017.
Insulator, Britannica Online Encylopedia Full Article, http://www.britannica.com/print/article/289459, 2 pages—Ex. 1018.
*Home Depot USA, Inc.*, v. *Lynk Labs, Inc.* Case IPR2022-00023 U.S. Pat. No. 10,517,149 Issue Date Dec. 24, 2019, Petition for Inter Partes Review dated Oct. 20, 2021, 74 pages.
*Home Depot USA, Inc.*, v. *Lynk Labs, Inc.* Case IPR2022-00023 U.S. Pat. No. 10,517,149 Issue Date Dec. 24, 2019, Petitioner's Power of Attorney dated Oct. 20, 2021, 2 pages.
*Home Depot USA, Inc.*, v. *Lynk Labs, Inc.* Case IPR2022-00023 U.S. Pat. No. 10,517,149 Issue Date Dec. 24, 2019, Patent Owner's Mandatory Notices Pursuant to 37 C.F.R. Section 42.8 dated Nov. 10, 2021, 5 pages.
*Lynk Labs, Inc.* v. *Home Depot USA, Inc. The Home Depot, Inc., and Home Depot Product Authority, LLC*, Case No. 6:21-cv-00097-ADA, Defendants' Corrected Reply Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Nov. 10, 2021—60 pages.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 1.
*Lynk Labs, Inc.* v. *Home Depot USA, Inc. The Home Depot, Inc., and Home Depot Product Authority, LLC*, Case No. 6:21-cv-00097-ADA, Plaintiff Lynk Labs, Inc.'s Responsive Claim Construction Brief filed Oct. 27, 2021, Part 2.
*Lynk Labs, Inc.*, v. *Home Depot USA, Inc. The Home Dept Inc., and Home Depot Product Authority, LLC*, Case No. 6:21-cv-00097-ADA, Home Depot's Preliminary Invalidity Contentions And Additional Disclosure Pursuant to Scheduling Order dated Aug. 18, 2021—22 pages.
U.S. Pat. No. 10,492,251 (251 Patent)—Exhibit A-01—Takeo '301.
U.S. Pat. No. 10,492,251 (251 Patent)—Exhibit A-02—Lynam '623.
U.S. Pat. No. 10,492,251 (251 Patent)—Exhibit A-03—Filipovsky '319.
U.S. Pat. No. 10,492,251 (251 Patent)—Exhibit A-04 Deese '719.
U.S. Pat. No. 10,492,251 (251 Patent)—Exhibit A-05 Okuno.
U.S. Pat. No. 10,492,251 (251 Patent)—Exhibit A-06—Ohishi '319.
U.S. Pat. No. 10,492,251 (251 Patent)—Exhibit A-07 Teshima.
U.S. Pat. No. 10,349,479 ("'479 Patent")—Exhibit B-01 Dowling.
U.S. Pat. No. 10,349,479 ("'479 Patent")—B-02 Ter Weeme.
U.S. Pat. No. 10,349,479 ("'479 Patent")—Exhibit B-03 Lin.
U.S. Pat. No. 10,349,479 ("'479 Patent")—Exhibit B-04 Lys '483.
U.S. Pat. No. 10,349,479 ("'479 Patent")—Exhibit B-05 Leong '814.
U.S. Pat. No. 10,349,479 ("'479 Patent")—Exhibit B-06 Calon.
U.S. Pat. No. 10,349,479 ("'479 Patent")—Exhibit B-07 Nakagawara.
U.S. Pat. No. 10,757,783 ("'783 Patent")—Exhibit C-01 Grajcar.
U.S. Pat. No. 10,757,783 ("'783 Patent")—Exhibit C-02 Reymond.
U.S. Pat. No. 10,757,783 ("'783 Patent")—Exhibit C-03 Walter.
U.S. Pat. No. 10,757,783 ("'783 Patent")—Exhibit C-04 Lyos '901.
U.S. Pat. No. 10,757,783 ("'783 Patent")—Exhibit C-05 Hair.
U.S. Pat. No. 10,757,783 ("'783 Patent")—Exhibit C-06 Cho.
U.S. Pat. No. 10,757,783 ("'783 Patent")—Exhibit C-07 Coleman.
U.S. Pat. No. 10,757,783 ("'783 Patent")—Exhibit C-08 Shimizu.
U.S. Pat. No. 10,154,551 ("'551 Patent")—Exhibit D-01 Saito.
U.S. Pat. No. 10,154,551 ("'551 Patent")—Exhibit D-02 Hochstein '168.
U.S. Pat. No. 10,154,551 ("'551 Patent")—Exhibit D-03 Reymond.
U.S. Pat. No. 10,154,551 ("'551 Patent")—Exhibit D-04 Panagotacos.
U.S. Pat. No. 10,154,551 ("'551 Patent")—Exhibit D-05 Liu.
U.S. Pat. No. 10,154,551 ("'551 Patent")—Exhibit D-06 Deese 450.
U.S. Pat. No. 10,154,551 ("'551 Patent")—Exhibit D-07 Lys.
U.S. Pat. No. 10,154,551 ("'551 Patent")—Exhibit D-08 Shimizu.
U.S. Pat. No. 10,517,149 ("'149 Patent")—Exhibit E-01 Takahashi.
U.S. Pat. No. 10,517,149 ("'149 Patent")—Exhibit E-02 Saito '590.
U.S. Pat. No. 10,517,149 ("'149 Patent")—Exhibit E-03 Lys '399.
U.S. Pat. No. 10,517,149 ("'149 Patent")—Exhibit E-04 Catalano '081.
U.S. Pat. No. 10,517,149 ("'149 Patent")—Exhibit E-05 Deese 719.
U.S. Pat. No. 10,652,979 ("'979 Patent")—Exhibit F-01 Coats '555.
U.S. Pat. No. 10,652,979 ("'979 Patent")—Exhibit F-02 Birrell '406.
U.S. Pat. No. 10,652,979 ("'979 Patent")—Exhibit F-03 Muthu '159.
U.S. Pat. No. 10,652,979 ("'979 Patent")—Exhibit F-04 Teshima '408.
U.S. Pat. No. 10,652,979 ("'979 Patent")—Exhibit F-05 Takeo.
U.S. Pat. No. 10,652,979 ("'979 Patent")—Exhibit F-06 Deese '719.
U.S. Appl. No. 60/839,453, filed Aug. 23, 2006, entitled "Lighting Device and Lighting Method" to Van de Ven and Negley, ("453 Provisional").
U.S. Appl. No. 60/793,524, filed Apr. 20, 2006, entitled "Lighting Device and Lighting Method" to Van de Ven and Negley, ("524 Provisional").
U.S. Appl. No. 60/844,325, filed Sep. 13, 2006, entitled "Boost/Flyback Power Supply Topology With Low Side Mosfet Current Control" to Myers ("Myers").
Interim LED Purchase Specifications of the Institute of Transportation Engineers, Jul. 1998 ("1998 Specification").
"Comparison of Control Options in Private Offices in an Advanced Lighting Controls Testbed," by Judith D. Jennings et al., and published in Apr. 1999 ("Jennings").
Vehicle Detection Using a Magetic Field Sensor, by Stanely V. Marshall, and published in May 1978 ("Marshall").
*Samsung Electronics Co., Ltd.* v. *Lynk Labs, Inc.* U.S. Pat. No. 10,492,251 Petition for Inter Partes Review of U.S. Pat. No. 10,492,251, 95 pages.
*Samsung Electronics Co., Ltd.* v. *Lynk Labs, Inc.* U.S. Pat. No. 10,492,251 Power of Attorney for Petitioner Samsung Electronics Co., Ltd. 3 pages.
*Samsung Electronics Co., Ltd.* v. *Lynk Labs, Inc.* U.S. Pat. No. 10,492,251 Petitioner's Notice Regarding Multiple Petitions, 9 pages.
*Samsung Electronics Co., Ltd.* v. *Lynk Labs, Inc.* Case: IPR2022-00051, U.S. Pat. No. 10,492,251 Patent Owner's Mandatory Notices Pursuant to 37 C.F.R. Section 42.8, 5 pages.

(56) References Cited

OTHER PUBLICATIONS

*Samsung Electronics Co., Ltd.* v. *Lynk Labs, Inc.*, U.S. Pat. No. 10,492,251 Declaration of R. Jacob Baker, Ph.D., P.E. In Support of Petition for Inter Partes Review of U.S. Pat. No. 10,492,251, 173 pages—Ex. 1002.
U.S. Appl. No. 16/148,945, filed Feb. 15, 2019, 309 pages—Ex. 1004.
U.S. Appl. No. 61/331,225, filed May 4, 2010, 63 pages—Ex. 1010.
Watson Mastering Electronics, Third Edition, pp. 1-151—Ex. 1012 and Ex. 1018.
Stan Gibilisco, Handbook of Radio & Wireless Technology, pp. 1-188—Ex. 1013.
Defendant Lynk Labs, Inc.'s Response to Plaintiffs' Initial Non-Infringement, Unenforceability, and Invalidity Contentions, 51 pages—Ex. 1038.
File History for U.S. Pat. No. 9,198,237 Issued May 18, 2011—Part 2, 321 pages—Ex. 1039.
Tim Williams, The Circuit Designer's Companion, First Published 1991, ISBN 0 7506 1142 1, 314 pages—Ex. 1042, Ex. 1094.
PCT File History US/2011/36359, filed May 12, 2011—Ex. 1050.
PCT File History US/2010/62235, filed Dec. 28, 2010—Ex. 1052, Ex. 1039.
U.S. Provisional Application filed May 12, 2010—Ex. 1063.
U.S. Provisional Application filed Dec. 28, 2009—Ex. 1064.
U.S. Provisional Application filed Dec. 31, 2009—Ex. 1065.
U.S. Appl. No. 60/547,653, filed Feb. 25, 2004—Ex. 1067.
U.S. Appl. No. 60/559,867, filed Feb. 25, 2004—Ex. 1068.
Civil Docket for Case# 6:21-cv-02665, Northern District of Illinois, Samsung Electronics. Co., Ltd., filed May 17, 2021, 14 pages—Ex. 1076, Ex. 1061.
Civil Docket for Case# 6:21-cv-00097-ADA, Western District of Texas (Waco)—Lynk Labs, Inc. filed Jan. 29, 2001, 9 pages—Ex. 1077, Ex. 1074.
US District Court for the Northern District of Illinois, Estimated Patent Case Schedule, 2 pages—Ex. 1079, Ex. 1062.
*Samsung Electronics Co., Ltd. and Samsung Electronics America, Inc.*, v. *Lynk Labs, Inc.*, Case No. 1:21-cv-02665—Supplemental Report of Parties' Planning Meeting, filed Oct. 14, 2021, 11 pages—Ex. 1080, Ex. 1075.
*Samsung Electronics Co., Ltd. and Samsung Electronics America, Inc.*, v. *Lynk Labs, Inc.*, Case No. 1:21-cv-02665—Defendant Lynk Labs, Inc's Answer to Plaintiffs Samsung Electronics Co., Ltd. and Samsung Electronics America, Inc.'s First Amended Complaint and Counterclaims, filed Aug. 3, 2021, 67 pages—Ex. 1082, Ex. 1071.
*Samsung Electronics Co., Ltd. and Samsung Electronics America, Inc.*, v. *Lynk Labs, Inc.*, Case No. 1:21-cv-02665—Defendant Lynk Labs, Inc.'s Amended Preliminary Infringement Contentions, 9 pages—Ex. 1083, Ex. 1066.
U.S. Pat. No. 10,492,251 ("the '251 Patent") Exemplary Infringement Contention Claim Charts, Appendix A-1 through J-1—Ex. 1084.
*Samsung Electronics Co., Ltd. et al.* v. *Lynk Labs, Inc.* Case No. 1:21-cv-02665, Notification of Docket Entry Jul. 27, 2021, 1 page—Ex. 1085, Ex. 1068.
*Samsung Electronics Co., Ltd., and Samsung Electronics America, Inc.* v. *Lynk Labs, Inc.*, No. 21 C 2665, Order dated Aug. 19, 2021—Ex. 1086.
*Samsung Electronics Co., Ltd. et al.* v. *Lynk Labs, Inc.* Case No. 1:21-cv-02665, Notification of Docket Entry Oct. 18, 2021, 1 page—Ex. 1087, Ex. 1070.
*Lynk Labs, Inc.*, v. *Home Dept USA, Inc., The Home Depot Inc., and Home Depot Product Authority, LLC*, Case. No. 6:21-cv-00097, Complaint For Patent Infringement dated Jan. 29, 2021, 88 page—Ex. 1088, Ex. 1072.
*Lynk Labs, Inc.*, v. *Home Dept USA, Inc., The Home Depot Inc., and Home Depot Product Authority, LLC*, Case. No. 6:21-cv-00097-ADA, First Amended Complaint For Patent Infringement dated Mar. 17, 2021, 94 pages—Ex. 1089, Ex. 1073.
*Samsung Electronics Co., Ltd. et al.* v. *Lynk Labs, Inc.* Case IPR2022-00051, U.S. Pat. No. 10,492,251 Notice of Filing Date Accorded to Petition, mailed Dec. 9, 2021, 5 pages.
Petition for Inter Partes Review, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 95 pages dated Aug. 18, 2021.
Petitioners' Power of Attorney, *Home Depot USA, Inc.*, Petitioner, v. *Lynk Labs, Inc.*, Patent Owner, Case IPR2021-001368 U.S. Pat. No. 10,757,783, Issue Date Aug. 25, 2020, Title: "Color Temperature Controlled and Low THD LED Lighting Devices and Driving the Same," 2 pages dated Aug. 17, 2021.
Declaration of Dr. Lebby U.S. Pat. No. 10,757,783 dated Aug. 18, 2021, 187 pages—Ex 1002.
U.S. Appl. No. 16/440,884, filed Jun. 13, 2019, 341 pages—Ex 1003.
Institute of Transportation Engineers, Publication No. ST-017B 300/IG/102, ISBN 0-935403-16-7 (1998), 25 pages—Ex 1007.
Complaint for Patent Infringement *Lynk Labs, Inc.* v. *Home Depot USA Inc., The Home Depot Inc., and Home Depot Product Authority, LLC*, Case No. 6:21-cv-00097, filed Jan. 29, 2021, 86 pages—Ex. 1010.
U.S. Appl. No. 61/630,025, filed Dec. 2, 2011, 39 pages—Ex 1012.
U.S. Appl. No. 61/570,200, filed Dec. 13, 2011, 51 pages—Ex 1013.
Plaintiff Lynk Labs, Inc.'s Amended Preliminary Infringement Contentions, Case No. 6:21-cv-00097-ADA, dated Jun. 23, 2021, 7 pages—Ex 1019.
Okon et al., "The First Practical LED", 14 pages—Ex 1020.
Scheduling Order, Case No. 6:21-cv-00097-ADA filed Aug. 13, 2021, 4 pages—Ex 1021.
U.S. Appl. No. 61/233,829, filed Aug. 14, 2009, 36 pages—Ex 1022.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Declaration of Dr. Dean Neikirk U.S. Pat. No. 10,932,341, 140 pages—Ex. 1002.
*Home Depot U.S.A., Inc.*, v. *Lynk Labs, Inc.*, U.S. Pat. No. 10,932,341, Filing Date: Jan. 10, 2020, Issue Date: Feb. 23, 2021—PGR2022-00009; Petition for Post Grant Review of U.S. Pat. No. 10,932,341, 94 pages.
U.S. Appl. No. 16/740,295, filed Jan. 10, 2020 (Part 1) 768 pages—Ex. 1003.
U.S. Appl. No. 16/740,295, filed Jan. 10, 2020 (Part 2) 466 pages—Ex. 1003.
*Lynk Labs, Inc.*, v. *Home Depot USA, Inc., The Home Depot Inc., and Home Depot Product Authority, LLC*, Case No. 6:21-cv-00097, Complaint for Patent Infringement dated Jan. 29, 2021—Ex. 1011.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Amended Preliminary Infringement Contentions, dated Jun. 23, 2021, 241 pages—Ex. 1012.
*Lynk Labs, Inc.*, v. *Home Depot USA, Inc., The Home Depot Inc., and Home Depot Product Authority, LLC*, Case No. 6:21-cv-00097-ADA, Defendants' Opening Claim Construction Brief on the Terms of U.S. Pat. Nos. 10,091,842, 10,154,551, 10,349,479, 10,492,251, 10,517,149, 10,537,001, 10,652,979, 10,757,783, and 10,932,341 filed Oct. 6, 2021, 38 pages—Ex. 1021.
*Lynk Labs, Inc.*, v. *Home Depot USA, Inc., The Home Depot Inc., and Home Depot Product Authority, LLC*, Case No. 6:21-cv-00097-ADA, Plaintiff Lynk Labs, Inc.'s Responsive Claim Construction Brief filed Oct. 27, 2021, 47 pages—Ex. 1022.
Application Multi-Voltage and Multi-Brightness LED Lighting Devices And Methods Of Using Same, Remarks filed Jun. 13, 2019 12 pages—Ex. 1023.
U.S. Appl. No. 15/369,218 Non-Final Office Action dated Oct. 2, 2018—Ex. 1024.
Response to Office Action U.S. Appl. No. 16/440,884, filed Aug. 22, 2019, 11 pages—Ex. 1026.
IEEE 100 The Authoritative Dictionary of IEEE Standards Terms Seventh Edition, Published by Standards Information Network IEEE Press, 3 pages—Ex. 1028.

(56) References Cited

OTHER PUBLICATIONS

Response to Office Action U.S. Appl. No. 16/440,884, filed Jun. 16, 2020, 8 pages—Ex. 1029.
*Home Depot USA, Inc.*, v. *Lynk Labs, Inc.*, Case PGR2022-00009, U.S. Pat. No. 10,932,341, Patent Owner's Mandatory Notices Pursuant to 37 C.F.R. Section 42.8 dated Nov. 19, 2021, 5 pages.
*Home Depot USA, Inc.*, v. *Lynk Labs, Inc.*, Case PGR2022-00009, U.S. Pat. No. 10,932,341, Issue Date Feb. 23, 2021, Petitioner's Power of Attorney dated Nov. 5, 2021, 2 pages.
*Home Depot U.S.A., Inc.*, v. *Lynk Labs, Inc.*, U.S. Pat. No. 10,932,341, Filing Date: Jan. 10, 2020, Issue Date: Feb. 23, 2021, IPR 2022-00143, Petition for Inter Partes Review of U.S. Pat. No. 10,932,341 dated Nov. 24, 2021, 81 pages.
U.S. Pat. No. 10,091,842 ("'842 Patent")—Exhibit G-01 Bruning.
U.S. Pat. No. 10,091,842 ("'842 Patent")—Exhibit G-02 Ohishi '319.
U.S. Pat. No. 10,091,842 ("'842 Patent")—Exhibit G-03 Ruxton.
U.S. Pat. No. 10,091,842 ("'842 Patent")—Exhibit G-04 Walding.
U.S. Pat. No. 10,091,842 ("'842 Patent")—Exhibit G-05 Bohn.
U.S. Pat. No. 10,091,842 ("'842 Patent")—Exhibit G-06 Dowling.
U.S. Pat. No. 10,537,001 ("'001 Patent")—Exhibit H-01 Dowling.
U.S. Pat. No. 10,537,001 ("'001 Patent")—Exhibit H-02 Lys '321.
U.S. Pat. No. 10,537,001 ("'001 Patent")—Exhibit H-03 Miskin.
U.S. Pat. No. 10,537,001 ("'001 Patent")—Exhibit H-04 Leong '003.
U.S. Pat. No. 10,537,001 ("'001 Patent")—Exhibit H-05 Konno.
U.S. Pat. No. 10,932,341 ("'341 Patent")—Exhibit I-01 Ohishi '009.
U.S. Pat. No. 10,932,341 ("'341 Patent")—Exhibit I-02 Muthu '558.
U.S. Pat. No. 10,932,341 ("'341 Patent")—Exhibit I-03 Dowling.
U.S. Pat. No. 10,932,341 ("'341 Patent")—Exhibit I-04 Konno.
U.S. Pat. No. 10,932,341 ("'341 Patent")—Exhibit I-05 Leong '003.
U.S. Pat. No. 10,932,341 ("'341 Patent")—Exhibit I-06 Reymond.
"White Light Emitting Diode Development for General Illumination Applications" to James Ibbetson, published on May 1, 2006 ("Ibbetson").
*Samsung Electronics Co., Ltd. and Samsung Electronics America, Inc.* v. *Lynk Labs, Inc.*, Case No. 1:21-cv-02665, Samsung's Final Unenforcebility and Invalidity Contentions, dated Apr. 1, 2022—52 pages.
*Home Depot U.S.A., Inc.*, v. *Lynk Labs, Inc.* IPR2021-01367 U.S. Pat. No. 10,154,551 B2 Judgment, Final Written Decision Determining All Challenged Claims Unpatentable 35U.S.C. Section 318 (a) entered Feb. 14, 2023—30 pages.
*Home Depot U.S.A., Inc.*, v. *Lynk Labs, Inc.* IPR2021-01368 U.S. Pat. No. 10,757,783 B2 Decision, Final Written Decision Determining All Challenged Claims Unpatentable 35U.S.C. Section 318 (a) entered Jan. 27, 2023—36 pages.
*Home Depot U.S.A., Inc.*, v. *Lynk Labs, Inc.* IPR2021-01369 U.S. Pat. No. 10,492,251 B2 Judgment, Final Written Decision Determining All Challenged Claims Unpatentable 35U.S.C. Section 318 (a) entered Feb. 14, 2023—36 pages.
*Home Depot U.S.A., Inc.*, v. *Lynk Labs, Inc.* IPR2021-01370 U.S. Pat. No. 10,349,479 B2 Decision, Final Written Decision Determining All Challenged Claims Unpatentable 35 U.S.C. Section 318 (a) entered Jan. 18, 2023, Paper 46—60 pages.
*Samsung Electronics Co., Ltd.*, v. *Lynk Labs, Inc.* IPR2021-01299 U.S. Pat. No. 10,506,674 B2 Decision, Final Written Decision Determining All Challenged Claims Unpatentable 35U.S.C. Section 318 (a) entered Mar. 7, 2023—58 pages.
*Samsung Electronics Co., Ltd.*, Petitioner v. *Lynk Labs, Inc.* Patent Owner IPR 2021-01347, U.S. Pat. No. 10,966,298 B2; Judgment Final Written Decision Determining All Challenged Claims Unpatentable 35 USC Section 318(a) dated Mar. 13, 2023 Paper 27—57 pages.
*Samsung Electronics Co., Ltd.*, Petitioner v. *Lynk Labs, Inc.* Patent Owner IPR 2021-01345, U.S. Pat. No. 10,492,252 B2; Decision Final Written Decision Determining All Challenged Claims Unpatentable 35 USC Section 318(a) dated Mar. 15, 2023 Paper 28—50 pages.
*Samsung Electronics Co., Ltd.*, Petitioner v. *Lynk Labs, Inc.* Patent Owner IPR 2021-01346, U.S. Pat. No. 10,499,466 B1; Decision Final Written Decision Determining All Challenged Claims Unpatentable 35 USC Section 318(a) dated Mar. 15, 2023 Paper 29—64 pages.
*Samsung Electronics Co., Ltd.*, Petitioner v. *Lynk Labs, Inc.* Patent Owner IPR 2021-01576, U.S. Pat. No. 10,652,979 B2; Judgment Final Written Decision Determining All Challenged Claims Unpatentable 35 USC Section 318(a) dated Apr. 19, 2023 Paper 34—57 pages.
*Samsung Electronics Co., Ltd.*, Petitioner v. *Lynk Labs, Inc.* Patent Owner IPR 2021-01300, U.S. Pat. No. 11,019,697 B2; Judgment Final Written Decision Determining All Challenged Claims Unpatentable 35 USC Section 318(a) dated Mar. 13, 2023 Paper 35—54 pages.
*Home Depot USA, Inc.*, Petitioner v. *Lynk Labs, Inc.* Patent Owner IPR 2021-01540, U.S. Pat. No. 10,091,842 B2; Judgment Final Written Decision Determining All Challenged Claims Unpatentable 35 USC Section 318(a) dated Mar. 29, 2023 Paper 46—31 pages.
*Home Depot USA, Inc.*, Petitioner v. *Lynk Labs, Inc.* Patent Owner IPR 2021-01541, U.S. Pat. No. 10,537,001 B2; Judgment Final Written Decision Determining All Challenged Claims Unpatentable 35 USC Section 318(a) dated Apr. 26, 2023 Paper 39—40 pages.
*Home Depot USA, Inc.*, Petitioner v. *Lynk Labs, Inc.* Patent Owner IPR 2022-00023, U.S. Pat. No. 10,517,149 B2; Judgment Final Written Decision Determining Some Challenged Claims Unpatentable 35 USC Section 318(a) dated May 5, 2023 Paper 40—55 pages.
*Samsung Electronics Co., Ltd.*, Petitioner v. *Lynk Labs, Inc.* Patent Owner IPR 2022-00098, U.S. Pat. No. 10,517,149 B2 Judgment Final Written Decision Determining Some Challenged Claims Unpatentable 35 USC Section 318(a) dated May 5, 2023 Paper 29—46 pages.
*Samsung Electronics Co., Ltd.*, Petitioner v. *Lynk Labs, Inc.* Patent Owner IPR 2021-01575, U.S. Pat. No. 10,154,551 B2 Judgment Final Written Decision Determining All Challenged Claims Unpatentable 35 USC Section 318(a) dated May 10, 2023 Paper 38—42 pages.
*Samsung Electronics Co., Ltd.*, Petitioner v. *Lynk Labs, Inc.* Patent Owner IPR 2022-00098 U.S. Pat. No. 10,517,149 B2 Judgment Final Written Decision Determining Some Challenged Claims Unpatentable 35 U.S.C Section 318(a) Paper 29 entered May 5, 2023 46 pages.
*Samsung Electronics Co., Ltd.*, Petitioner v. *Lynk Labs, Inc.* Patent Owner IPR 2022-00101, U.S. Pat. No. 10,750,583 B2 Judgment Final Written Decision Determining No Challenged Claims Unpatentable 35 U.S.C Section 318(a) Paper 30 entered May 25, 2023—34 pages.
*Samsung Electronics Co., Ltd.*, Petitioner v. *Lynk Labs, Inc.* Patent Owner IPR 2022-00100, U.S. Pat. No. 10,750,583 B2 Judgment Final Written Decision Determining All Challenged Claims Unpatentable 35 U.S.C Section 318(a) Paper 30 entered Jun. 7, 2023—42 pages.
*Samsung Electronics Co., Ltd.*, Petitioner v. *Lynk Labs, Inc.* Patent Owner IPR 2022-00051, U.S. Pat. No. 10,492,251 B2 Judgment Final Written Decision Determining All Challenged Claims Unpatentable 35 U.S.C Section 318(a) Paper 37 entered Jun. 2, 2023—22 pages.
*Home Depot U.S.A., Inc.*, Petitioner v. *Lynk Labs, Inc.* Patent Owner PGR2022-00009, U.S. Pat. No. 10,932,341 B2 Judgment Final Written Decision Determining All Challenged Claims Unpatentable Paper 38 entered May 22, 2023—79 pages.
*Samsung Electronics Co., Ltd.*, Petitioner v. *Lynk Labs, Inc.* Patent Owner IPR2022-00052, U.S. Pat. No. 10,492,251 B2 Judgment Final Written Decision Determining All Challenged Claims Unpatentable 35 U.S.C.Section 318(a) Paper 38 entered Jun. 2, 2023—37 pages.
*Samsung Electronics Co., Ltd.*, Petitioner v. *Lynk Labs, Inc.*, Patent Owner IPR2022-00149, U.S. Pat. No. 10,687,400 B2 Judgment Final Written Decision Determining All Challenged Claims Unpatentable 35 U.S.C. Section 314(a) Paper 33 dated Jun. 26, 2023—70 pages.

(56) References Cited

OTHER PUBLICATIONS

*Samsung Electronics Co., Ltd.*, Petitioner v. *Lynk Labs, Inc.*, Patent Owner IPR2021-01575, U.S. Pat. No. 10,154,551 B2 Judgment Final Written Decision Determining All Challenged Claims Unpatentable 35 U.S.C. Section 318(a) Paper 38 dated May 10, 2023—42 pages.

* cited by examiner

FIG. 1
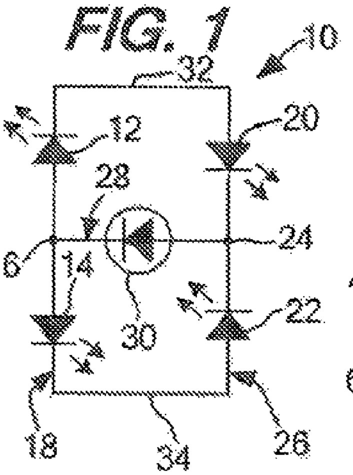
FIG. 2
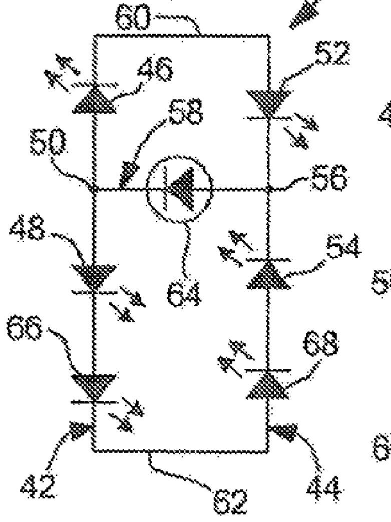
FIG. 3
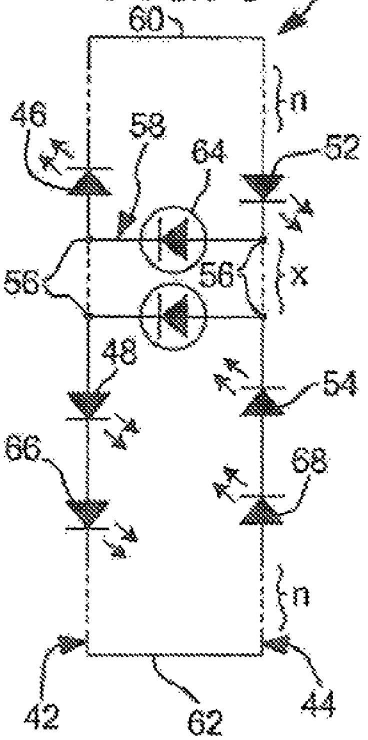
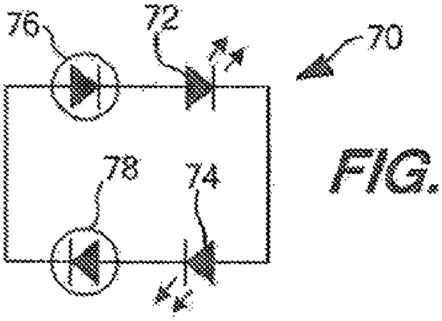
FIG. 4
FIG. 5
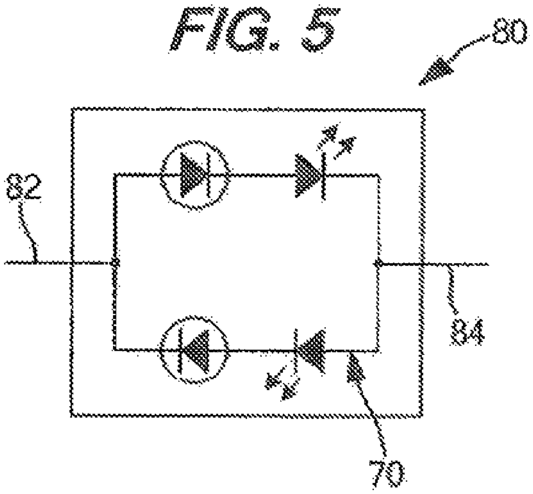
FIG. 6
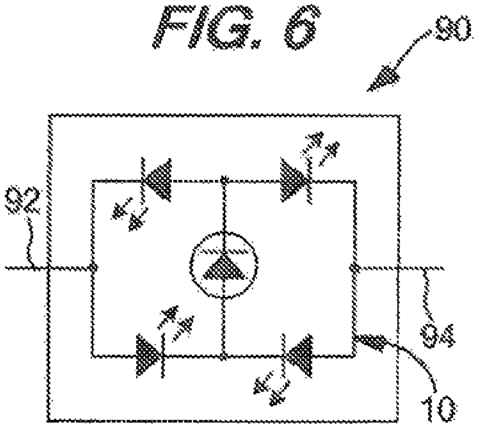

FIG. 7
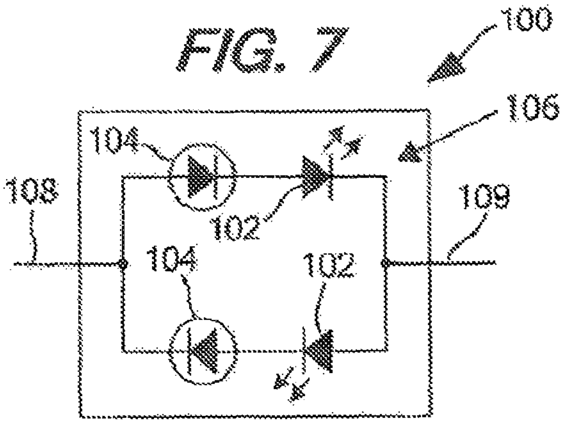
FIG. 8
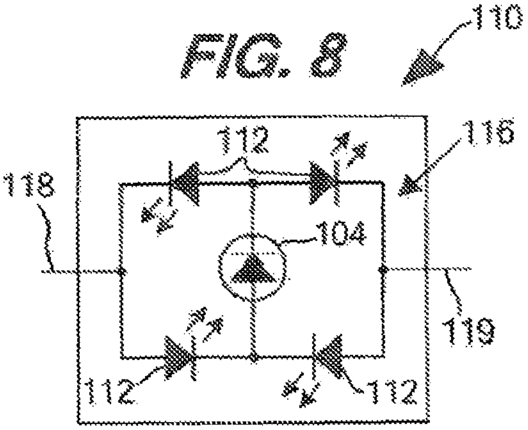
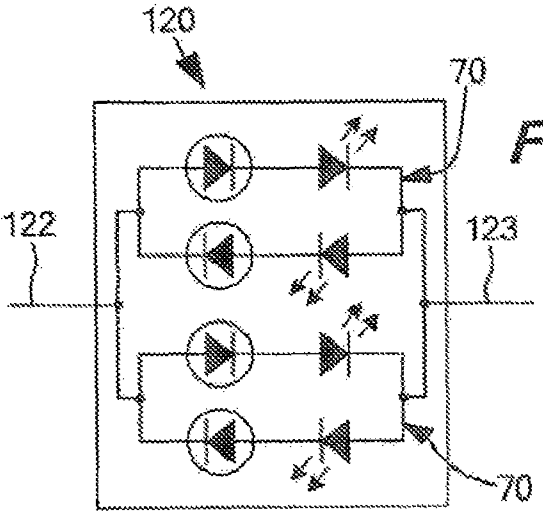
FIG. 9
FIG. 10
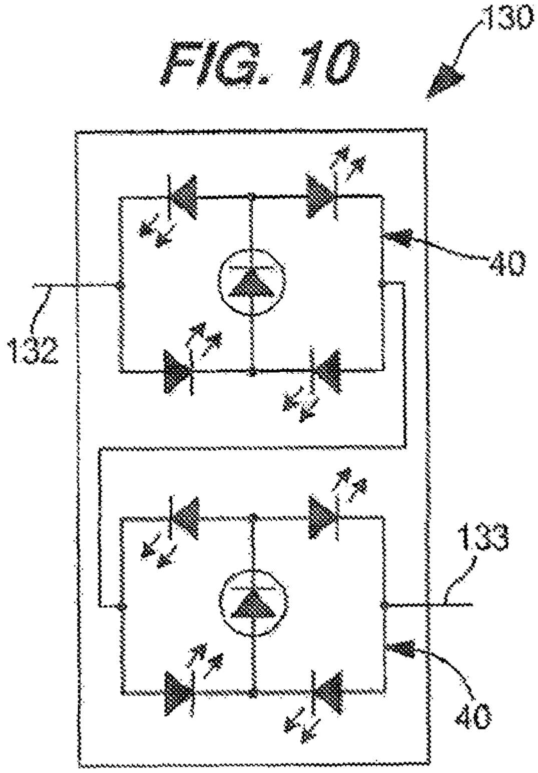
FIG. 11
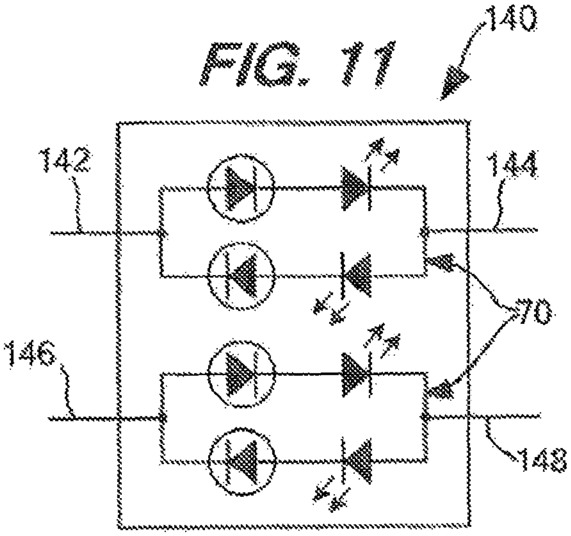

DEVICES AND SYSTEMS HAVING AC LED CIRCUITS AND METHODS OF DRIVING THE SAME

RELATED APPLICATIONS

This application is a continuation of U.S. patent application Ser. No. 15/632,906, filed Jun. 26, 2017, now U.S. Pat. No. 10,257,892, which is a continuation of U.S. patent application Ser. No. 14/886,252, filed Oct. 19, 2015, now U.S. Pat. No. 9,693,405, which is a continuation of U.S. patent application Ser. No. 14/239,504 filed Feb. 18, 2014, which is a 371 national phase of International Application No. PCT/US2012/051531, filed Aug. 20, 2012, which claims priority to U.S. Provisional Application No. 61/575,273, filed Aug. 18, 2011—the contents of all of which are expressly incorporated herein by reference.

TECHNICAL FIELD

The present invention generally relates to light emitting diode ("LED") circuits for both AC and DC operation. More specifically, the present invention relates to driving LED circuits, devices, and systems using both AC and DC power, with or without a current limiting element included in the LED circuit.

FEDERALLY SPONSORED RESEARCH OR DEVELOPMENT

None.

BACKGROUND OF THE INVENTION

LEDs are semiconductor devices that produce light when a current is supplied to them. LEDs are intrinsically DC devices that only pass current in one polarity, and historically have been driven by DC power supplies. When driven by DC power supplies, LEDs are typically provided in a string or parallel strings of LEDs which operate in the forward direction such that each LED is continuously operable. Once one LED within a string of LEDs burns out, the entire string will be rendered inoperable and the device containing the string may have to be replaced.

Recent advancements in the field of lighting have led to the use of LED circuits which are capable of using AC power to drive LEDs configured in particular circuit arrangements such that some of the LEDs operate during the positive phase of the AC power cycle and some LEDs operate during the negative phase of the AC power cycle. While this may extend the life of some LEDs within the circuit(s) as they will be turned on or off, flicker may become an issue as the voltage raises up and down, and the other known LED problems are realized.

Whether powered by AC or DC power sources, the amount of current flowing through an LED may dramatically affect the light output of and lifespan of the LED. This is because LEDs emit light based on the amount of current passing through them—the more current that passes through the LED, the brighter the LED will shine. Also, as the current passing through each LED increases, the heat produced by each LED generally increases. Exposure to high or constantly changing heat levels may affect how long an LED will remain operational and reduces efficacy.

In order to control the current flowing through each LED, it is known in the art to place a resistor in series with the LED circuit. While the resistor will provide some current protection in the circuit, it will not prevent the current from reaching higher levels if an increased amount of voltage is applied to the circuit. A resistor will also waste energy and raise heat levels within the circuit. As the voltage applied to the circuit ultimately increases, so will the current and heat within the circuit.

Therefore, it would be advantageous to design a circuit, device, or system utilizing LEDs that limits and controls the current in an LED circuit.

It would also be advantageous to design a circuit, device, or system where AC LED circuits may be used with DC power in a manner which may extend device or system life.

The present invention is provided to solve these and other issues.

SUMMARY OF THE INVENTION

Accordingly, the present invention is directed to a lighting device or system having at least one circuit capable of emitting light when powered by an AC power source. The at least one circuit may include a constant current or current limiting diode in order to substantially maintain a constant and an "upper limit" of current within the circuit, no matter how high the voltage provided by the AC power source gets.

According to one aspect of the invention, a lighting device having at least one circuit capable of emitting light when powered by an AC power source is provided. The circuit may include at least two LEDs connected in a series, a parallel, or an anti-parallel configuration, and at least one current limiting diode connected in series or parallel with at least one of the at least two LEDs. The circuit may be configured in any configuration whereby at least one of the at least two LEDs emits light during a positive phase of provided AC power, and at least one of the at least two LEDs emits light during a negative phase of provided AC power. It is contemplated that the circuit configuration itself may allow for light to be emitted by at least one LED during both the positive and negative phase, or alternatively that a bridge rectifier having diodes, LEDs or a combination thereof, may rectify both the positive and negative phases of the LEDs and provide the rectified power to a string of at least two LEDs.

According to another aspect of the invention, the at least one circuit within the lighting device includes at least first and second branches connecting at first and second common points, the common points providing an input and an output for a driving voltage for the circuit. The first branch of the LED circuit may include at least a first and a second LED connected in opposing series relationship such that the inputs of the first and second LEDs define a first branch junction. Similarly, the second branch may include at least a third and a fourth LED connected in opposing series relationship such that the outputs of the third and fourth LEDs define a second branch junction. The first and second branches connect to one another such that the output of the first LED is connected to the input of the third LED at the first common point, and the output of the second LED is connected to the input of the fourth LED at the second common point. The at least one current limiting diode may be connected in a manner which forms a first cross-connecting circuit branch. The input of the at least one current limiting diode may be connected to the second branch junction while the output may be connected to the first branch junction.

According to another aspect of the invention, the at least one circuit may include at least one additional LED connected in series with each of the second and fourth LEDs than is connected in series with each of the first and third LEDs between each LEDs respective common point and branch junction. Alternatively, one additional LED may be connected in series with each of the first and third LEDs than is connected in series with each of the second and fourth LEDs between each LEDs respective common point and branch junction. The at least one LED circuit may further include n additional LEDs, in pairs, wherein the pairs are configured among the first and second branch circuits of the first circuit such that that the current draw through the first circuit during both AC phases is substantially the same.

According to another aspect of the invention, the at least one LED circuit may include x additional cross-connecting circuit branches. Each cross-connecting circuit branch may have one or more diodes and be connected in parallel to the first cross-connecting circuit branch. The diodes connected in any additional cross-connecting circuit branches may be standard diodes, LEDs or additional current limiting diodes.

According to one aspect of the invention, the lighting device may include at least one circuit having the at least two LEDs connected in an anti-parallel configuration. At least one current limiting diode in the circuit may be connected in series with the anti-parallel LED circuit, or alternatively, at least one current limiting diode may be connected in series with each of the at least two LEDs. At least one additional LED may be connected in series with each anti-parallel LED to form anti-parallel series strings of LEDs. Like an anti-parallel circuit having two LEDs, at least one current limiting diode may be connected in series with both series string of LEDs, i.e. the anti-parallel series strings, or at least one current limiting diode may be connected in series with each series string of LEDs.

According to another aspect of the invention, the lighting device may be powered by a DC power supply or may include a bridge rectifier connected in series with the anti-parallel LEDs so that at least one LED is forward biased by power provided by the DC power supply or bridge rectifier and at least one LED is reverse biased by power provided by the DC power supply or bridge rectifier. The DC power supply or lighting device may further include a load sensor for sensing operation of the at least one forward biased LED. The load sensor, either by itself or using additional TTL logic, switches, relays, and/or circuitry, may be capable of reversing the polarity of the power provided by the bridge rectifier to forward bias the at least one LED that was reversed biased if the sensor fails to detect that the at least one forward biased LED is operating.

According to one aspect of the invention, regardless of what circuit is utilized in the lighting device, the at least one circuit may be integrated into a single chip. The chip may include at least two power connection leads, the power connection leads being connected to opposite sides of the at least one circuit to allow the circuit to connect to an AC or DC power supply.

According to another aspect of the invention, the at least one circuit may be formed by placing individual LED die and at least one current limiting diode on a substrate to form an LED package. The LED may be flip chip or wire bond type LED die. Once on the substrate, the LEDs formed thereon may be coated with phosphor in order to affect the illumination color of the LEDs. Power connection leads may likewise be integrated on the substrate and connected to opposing ends of the at least one circuit formed thereon.

According to yet another aspect of the invention, two or more circuits connected in series or parallel may be formed on a single chip or substrate. When two or more circuits are formed on a single chip or substrate, two power connection leads may be provided and electrically connected to the two or more circuits to enable the two or more circuits to connect to an AC or DC power supply. The circuits may be connected in series, parallel, or series-parallel configurations. Alternatively, the at least two circuits on the chip or substrate may be electrically unconnected and be provided with separate and distinct power connection leads connected at the opposite ends of each circuit, allowing the circuits to be connected in any manner desired or required by an end user.

According to another aspect of the invention, the lighting device may be integrated within a lamp or bulb for use in a lighting system. The lamp may include a base having at least two power connection leads, the power connection leads being capable of connection to the device and at least one circuit so as to be capable of providing power to the at least one circuit from a power source. The lamp may be designed for a specific use, such as general lighting type incandescent replacement lamps and/or a brake light or head light in an automobile. It should be appreciated by those having ordinary skill in the art that any lamp design known in the art may be created utilizing any of the circuits described herein, and that the lamps may be used for any use. Examples of lamps that may be designed using the circuits, chips, packages and other LED devices described herein, include but are not limited to, Edison or E-base type lamps, festoon lamps, bi-pin lamps, or wedge base lamps.

According to one aspect of the invention, a lighting system is provided. The lighting system may include at least one circuit having at least two LEDs electrically connected and configured so that when the LEDs are connected to a DC power source, at least one LED within the circuit is forward biased by the DC power source, and at least one LED within the circuit is reversed biased by the DC power source. For example, the at least two LEDs in the lighting system may be connected in an anti-parallel configuration, however the at least two LEDs may be connected or configured in any manner known in the art, so long as at least one LED is forward biased and at least one LED is reverse biased when the circuit is connected to a DC power source.

The lighting system may also include a load sensor connected to the at least two LEDs. The load sensor may sense the operation of the at least one LED forward biased by the DC power source, and may be capable of reversing the polarity from the DC power source to forward bias the at least one LED previously reverse biased if the operation of the at least one LED which is forward biased fails. Rather than reverse the polarity itself, the load sensor may trip a relay, switch or provide a signal to TTL logic circuits or devices and/or additional circuitry which may reverse the polarity of the DC power provided to the circuit.

In order to provide DC power, the DC power source may include a bridge rectifier for rectifying AC power. The bridge rectifier may be part of the lighting system itself, or may be contained in a driver or external power source or supply. Alternatively, the rectifier may be contained in any lighting devices within the lighting system. The DC power source may also include the load sensor and any circuitry, switches or relays or TTL logic required to dynamically reverse the polarity of the provided DC power should the at least one LED that is forward biased fail.

According to another aspect of the invention, the lighting system may include at least one current limiting diode connected in series with the at least one circuit, or at least one current limiting diode connected in series with each of the at least one LED forward biased by the DC power source and the at least one LED is reversed biased by the DC power source.

According to another aspect of the invention, the at least one circuit in the lighting system may include at least four LEDs configured in a bridge configuration.

According to one aspect of the invention, a method for driving a lighting device or system is provided. At least two LEDs are connected such that at least one of the at least two LEDs is capable of emitting light during a positive phase of power provided by an AC power source, and at least one of the at least two LEDs is capable of emitting light during a negative phase of power provided by an AC power source. Rather than provide AC power, DC power may then be provided to the at least two LEDs. The at least two LEDs form a load on the DC power such that at least one of the at least two LEDs is forward biased and at least one of the at least two LEDs is reversed biased. The polarity of the DC power across the load may then be reversed to forward bias the at least one LED that was previously reverse biased and reverse bias the at least one LED that was previously forward biased in order to use the previously reverse biased LED should, for example, the previously forward biased LED fail.

According to another aspect of the invention, the load output may be monitored or sensed to insure that the at least one LED configured to be forward biased by the DC power is operational and conducting. If the at least one forward biased LED fails and is no longer operational, the polarity of the DC power across the load may be dynamically reversed so as to forward bias the at least one LED that was previously reverse biased. The dynamic reversal of the polarity of the DC power may be done at a DC power supply, may be accomplished using TTL logic devices or circuitry connected to the load within the device or system, or may be accomplished using circuitry connected to the DC power supply and/or load external to the device or system.

According to yet another aspect of the invention, the polarity of the DC power across the load may be reversed manually using a switch capable of controlling the connection between the DC power supply and the at least one load. Manually switching a system switch to an alternate setting may forward bias the at least one LED that was previously reverse biased if the at least one LED previously configured to forward biased is no longer emitting light. It is contemplated by the invention that the switch may be configured to forward bias either LED, regardless of whether either LED has failed. Alternatively, the DC power may be manually reversed by disconnecting the load, i.e. a circuit or device, from the DC power supply, and reconnecting it in a reversed configuration so that the power connection previously connected to ground or the low side of the DC supply is then connected to the high voltage side of the DC supply.

According to another aspect of the invention, the at least two LEDs in the system may be connected in an anti-parallel configuration, and may have at least one current limiting diode in series with the anti-parallel circuit, or may have at least one current limiting diode connected in series with each of the at least two LEDs.

According to another aspect of the invention, at least four diodes may be configured in a bridge configuration in the system. At least two of the at least five diodes may be LEDs with at least one of the at least two LEDs is capable of emitting light when forward biased by the connected DC power, and at least one of the at least two LEDs is reversed biased by the connected DC power.

Other advantages and aspects of the present invention will become apparent upon reading the following description of the drawings and detailed description of the invention.

BRIEF DESCRIPTION OF THE DRAWINGS

FIG. 1 shows a schematic view of a circuit as contemplated by the invention;

FIG. 2 shows a schematic view of a circuit as contemplated by the invention;

FIG. 3 shows a schematic view of a circuit as contemplated by the invention;

FIG. 4 shows a schematic view of a circuit as contemplated by the invention;

FIG. 5 shows a schematic view of a chip as contemplated by the invention;

FIG. 6 shows a schematic view of a chip as contemplated by the invention;

FIG. 7 shows a schematic view of a package as contemplated by the invention;

FIG. 8 shows a schematic view of a package as contemplated by the invention;

FIG. 9 shows a schematic view of a chip as contemplated by the invention;

FIG. 10 shows a schematic view of a chip as contemplated by the invention;

FIG. 11 shows a schematic view of a chip as contemplated by the invention;

DETAILED DESCRIPTION OF PREFERRED EMBODIMENTS

Figure 12A:
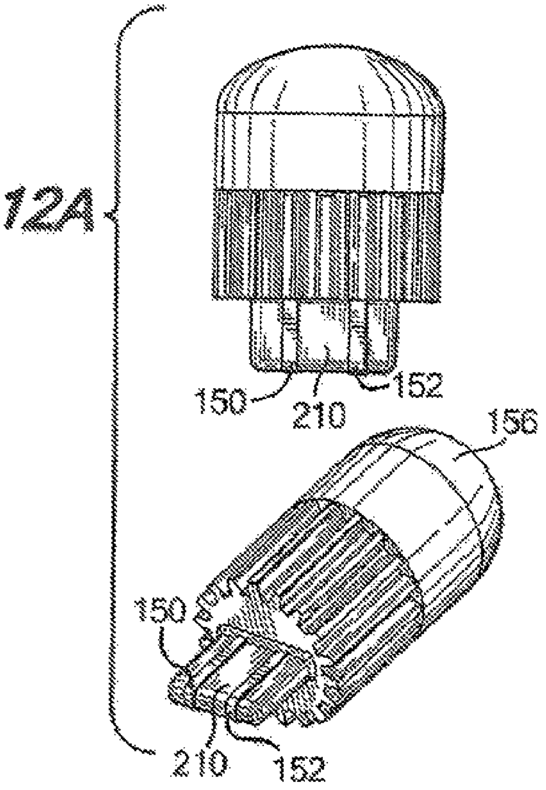
FIG. 12A shows a lighting system as contemplated by the invention.

While this invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

The present invention is directed to a lighting device or system, the light emitting circuits contained therein, and methods of driving and operating the same. As discussed herein, a lighting device may include any device capable of emitting light no matter the intention. Examples of devices which are contemplated by this invention include, but are not limited to, chips, packages, chip on board assemblies, LED assemblies or LED modules. The devices may also include any required power connections or drivers for the circuits emitting light within the device. A lighting system may include multiple such devices, and some or all of the required parts to drive such a device, including but not limited to, power supplies, rectifiers, sensors or light emitting circuitry discussed herein. A system may be, for example, a lamp or light bulb, a portable hand held light unit or indoor and outdoor lighting fixtures. While a lighting device may be incorporated into a lighting system, it is contemplated that any required light emitting elements may be included within the system directly, whether in the form a device as a chip or package, or as circuits within the system.

FIG. 1 discloses an embodiment of a circuit for use in a lighting device or system as contemplated by the invention. Circuit 10 includes LEDs 12, 14 connected at first branch junction 16 in opposing series relationship forming first branch 18, and LEDs 20, 22 connected at second branch junction 24 in an opposing series relationship forming second branch 26. First and second branch junctions 16, 24 are connected by cross-connecting branch 28 which includes current limiting (or constant current) diode 30. The first and second branches also connect at common points 32, 34—LEDs 12, 20 connecting at first common point 32 and LEDs 14, 22 connecting at second common point 34. In this configuration, when AC power is applied to the circuit, current limiting diode 30 is in series with LEDs 12, 22 during one phase (positive or negative) allowing those diodes to emit light. During the opposite AC phase (negative or positive), current limiting diode is in series with LEDs 14, 20, allowing those diodes to emit light. Although only a single cross-connecting branch is shown in FIG. 1, it is contemplated by the invention that any number of cross-connecting branches may be added in parallel to cross-connecting branch 28.

Using current limiting diode 30 as cross-connecting branch 28 insures that the current flowing through circuit 10 during both the positive and negative phase of any provided AC power remains substantially below a threshold level which may adversely affect the life of the LEDs. While a resistor or resistors connected as the cross-connecting circuit or between either common point and the power source may have an effect on the total amount of current flowing through the circuit, i.e. make it less than if no resistor was there, resistors can not prevent the current in the circuit from continually rising with the voltage. Resistors will not create an "upper limit" like a current limiting diode substantially does. A resistor will merely lower the value of the current in the circuit resulting from an applied voltage. In order to reduce the current in the circuit, resistors may also waste energy in the form of heat which can adversely affect the LEDs if contained within a device or system. While some heat and energy may be wasted by the internal resistance of the current limiting diode, the amount may be much less than that of a resistor.

Additionally, using current limiting diode 30 as cross-connecting branch 28 has the advantage of allowing a substantially constant current to flow during both the positive and negative phases as well. A substantially constant current may extend the lifespan of each LED. Inasmuch as the amount of light emitted by an LED is determined by the amount of current flowing through the LED, allowing a substantially constant amount of current through the circuit helps to mitigate any flicker effect caused by the AC voltage cycling. With a current limiting diode, the amount of light emitted by each LED will remain substantially constant during its respective conducting phase. A standard resistor is incapable of maintaining a substantially constant current.

FIGS. 2 and 3 disclose another embodiment of a circuit similar to circuit 10. Similar to circuit 10, circuit 40 includes first and second branches 42, 44 respectively. First branch 42 includes LEDs 46, 48 connected at first branch junction 50 while second branch 44 includes LEDs 52, 54 connected at second branch junction 56. First branch 42 is connected to second branch 44 at common points 60, 62—LEDs 46, 52 connect at common point 60, and LEDs 48, 54 connect at common point 62. Like in circuit 10, cross-connecting branch 58 may include a current limiting diode 64. In order to protect the LEDs within circuit 40 against reverse biasing, as shown in FIGS. 2 and 3, at least one additional LED may be connected in series with LEDs 48, 54 than LEDs 46, 52 between the associated common point and the branch junction or vice versa. As shown in FIG. 2, for example, this is embodied as LED 66 connected in series with LED 48 between branch junction 50 and common point 62 (one more than is connected in series with LED 46 between branch junction 50 and common point 60) and LED 68 connected in series with LED 54 between branch junction 56 and common point 62 (one more than is connected in series with LED 52 between branch junction 56 and common point 60).

As is seen in FIG. 3, any number n of additional LEDs may be added, in pairs in the first and second branches of the circuits such that the current draw through the first circuit during both AC phases is substantially the same. As also seen in FIG. 3, any number x of cross-connecting branches may be added in parallel to cross-connecting branch 58.

FIG. 4 shows yet another embodiment of a circuit as contemplated by this invention. Circuit 70 includes two LEDs, 72, 74 connected in an anti-parallel configuration. Connected in series with each LED is current limiting diode 76, 78 respectively. Connecting a current limiting diode in series with each LED insures that the current flowing through each LED is both substantially limited, and substantially constant, while the combination is forward biased.

It is contemplated by the invention that rather than have just two LEDs connected in an anti-parallel configuration, any number of additional LEDs may be added in series with LEDs 72, 74. In such embodiments, each series string of LEDs may include at least one current limiting diode in order to realize the advantages as discussed herein.

For use as a lighting device or in a lighting device or system, any of the circuits shown or described herein may be integrated on a single chip as shown in FIGS. 5 and 6. Chips 80 and 90 include circuits 70 and 10 respectively, integrated on a single chip. Power connection leads 82, 84 and 92, 94 are provided respectively, at opposing ends of each circuit 70, 10, in order to allow power to be provided thereto. It should be appreciated that circuit 40 in FIGS. 2 and 3 may likewise be integrated on a single chip as shown in FIGS. 5 and 6.

Rather than integrate on a single chip, it is contemplated by the invention that individual LED die and current limiting LEDs may be placed on a substrate forming a circuit in an LED package as shown in FIGS. 7 and 8. LED packages 100, 110 may include individual LED die 102, 112 and current limiting diodes 104, 114, which may be wire bonded together on substrate 106, 116. Substrate 106, 116 may include, or be attached to, a heat sink forming part of Packages 100, 110. LED packages 100, 110 may further include power connection leads 108, 109 and 118, 119 connected to opposing ends of the formed circuits for connecting the circuits and packages to a driver, power source or the like. Alternatively, rather than have power connection leads extending from each end, packages 100, 110 may be flip chips having power connections located on a bottom surface. As with chips 80, 90, it is contemplated that the circuits shown in FIGS. 2-4 may likewise be formed on a substrate by wire bonding individual LED die and current limiting diodes in the disclosed configuration.

Whether using chips or LED packages formed as described above, using the power connection leads may allow for multiple circuits, chips, and/or packages to be connected together in series, parallel, or series-parallel configurations. In operation, when connecting multiple chips in series or series-parallel, it is advantageous to insure that all current limiting diodes in each circuit in the series are substantially matched. While not required, substantially matching each current limiting diode will insure that each circuit is provided with the amount of current it is designed for. If one current limiting diode in a circuit allows less current than the current limiting diodes connected in series circuits, chips or packages, the amount of current in the series circuits may be less than ideal for those circuits. The light emitted from each circuit may be determined by the lowest value of current limiting diode in the series connection, as this value will substantially determine the current for the entire series.

As shown in FIGS. 9 and 10, rather than have to connect multiple chips or packages, it is contemplated that multiple circuits may be integrated onto a single chip or multiple circuits may be formed using multiple discrete LED die and current limiting diodes on a single substrate. It is also contemplated that multiple circuits may be formed by using multiple discrete packaged LEDs and current limiting diodes on a single substrate. FIGS. 9 and 10 show chips 120, 130 respectively. Though shown as chips, LED packages may be formed in the same manner as a single circuit package as described above. Chips 120, 130 each include at least two circuits 70, 10 respectively. The individual circuits may be connected in series (as shown in FIG. 10), parallel (as shown in FIG. 9), or where three or more circuits are included in the chip, series-parallel configuration. Power connection leads 122, 123 and 132, 133 may be provided and connected to the circuits as required to create the desired series or parallel configuration.

Alternatively, as shown in FIG. 11, rather than use a single power lead connection pair for multiple circuits on a single chip or in a single package, each circuit contained on the chip or within the package may be provided with its own power connection leads. As seen in FIG. 11, chip 140 may be provided with at least circuits 70, each circuit having its own power connection lead, 142, 144 and 146, 148. The power connection leads from each circuit may then be connected to any driver or power source for the chip in any manner desired by an end user. For example, circuits 70 may be connected in series with each other at power connection leads 144 and 148 while leads 142 and 146 connect to a power source. Alternatively, circuits 70 may be connected in parallel where leads 142, 144 and 146, 148 all connect to a power source. As additional circuits are added to the single chip or package, the additional circuits may be connected in series or parallel as provided above, depending on the needs or requirements of the system.

Figure 12C:
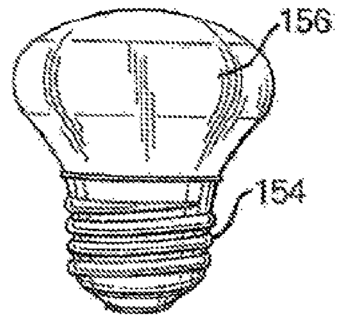
FIG. 12C shows a lighting system as contemplated by the invention.
Figure 12B:
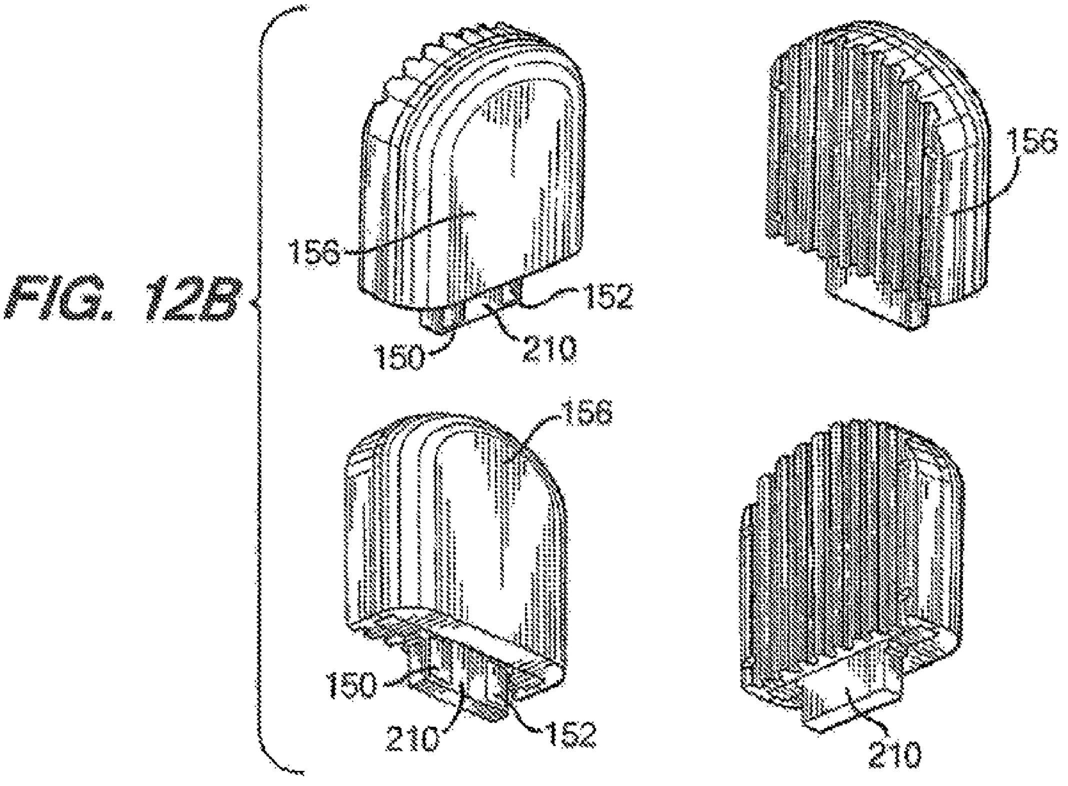
FIG. 12B shows a lighting system as contemplated by the invention.
Figure 12D:
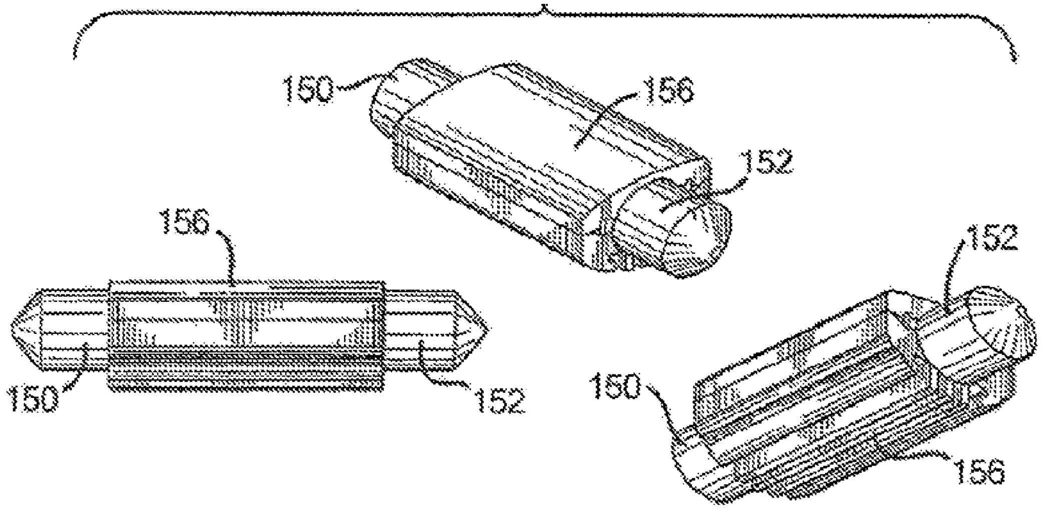
FIG. 12D shows a lighting system as contemplated by the invention.
Figure 12E:
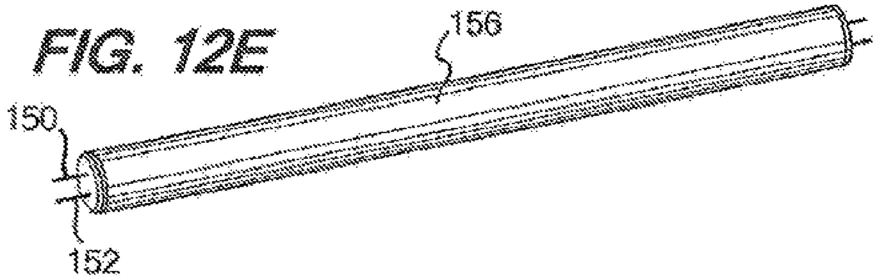
FIG. 12E shows a lighting system as contemplated by the invention.
Figure 13A:
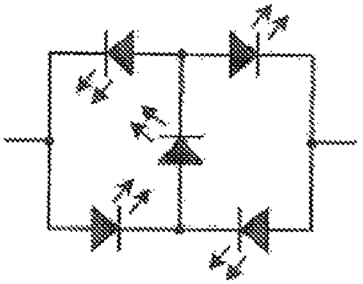
FIG. 13A shows a schematic view of a circuit as contemplated by the invention.
Figure 13C:
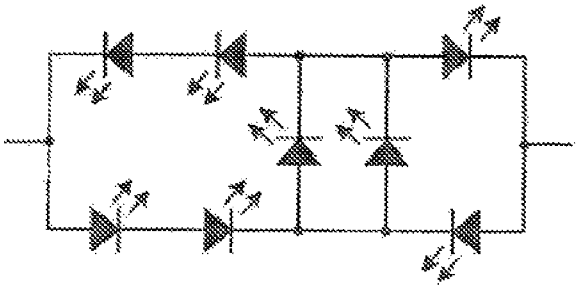
FIG. 13C shows a schematic view of a circuit as contemplated by the invention.
Figure 13B:
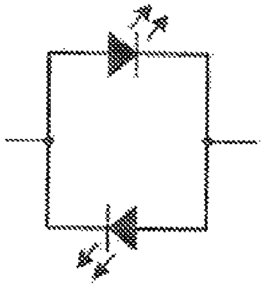
FIG. 13B shows a schematic view of a circuit as contemplated by the invention.
Figure 13D:
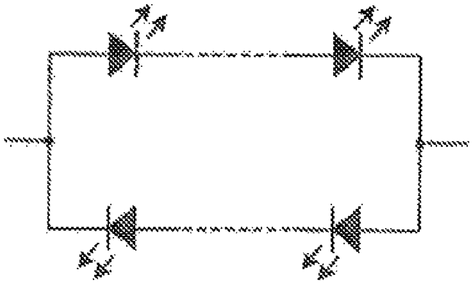
FIG. 13D shows a schematic view of a circuit as contemplated by the invention.

The chips and packages shown and described in FIGS. 5-10 may comprise lighting devices which may be packaged or utilized in a lighting system. As shown in FIGS. 12A-E, the lighting system may be embodied as any form of lamp or light bulb known and used in the art. The lighting device may include two power connection leads (see for example power connection leads 150, 152 in devices FIGS. 12A, 12B, 12D, and 12E) which correspond to the power connection leads on any enclosed chip, package or circuits. Alternatively, the lighting system may include Edison or E-base 154 as shown in FIG. 12C which includes two power connection leads inside the screw base which connects to a lighting fixture, driver or power source. Any lighting circuits, devices, or other required drivers or circuitry may be located within housing 156 of any of the systems shown in FIGS. 12A-E.

While the foregoing has been directed to protecting and enhancing LED circuits which are driven by AC power, it is contemplated by the present invention that the same or similar LED circuits and devices may be driven by DC power. For example, a DC power supply may be connected to common points 32, 34 in FIG. 1 and power connection leads 92, 94 in FIG. 6 so that one combination of LEDs (for example 12, 22 in FIG. 1) is forward biased and one combination of LEDs (for example 14, 20 in FIG. 1) is reverse biased. Likewise, a DC power supply may be connected to circuit 70 in FIG. 4 or power connection leads 82, 84 in FIG. 5 so that one LED (for example 72 in FIG. 4) is forward biased and one LED (for example 74 in FIG. 4) is reverse biased. Where series strings of LEDs are used in anti-parallel circuit 70, the additional LEDs would be forward or reverse biased based upon their configuration and which LED they are connected in series with.

In order to provide DC power to the circuits, it is contemplated by the invention that the circuits or devices may be connected to a DC power source, incorporated into a lighting system using DC power, may be powered from a bridge rectifier or some combination thereof. When DC power is provided by a bridge rectifier, it is contemplated that the bridge rectifier may be incorporated into the lighting device, a lighting system into which the circuit(s) and/or device(s) is incorporated into, or be formed as part of a power supply or driver which is formed in, or connected externally to, the device or system.

If the circuits or devices are connected to a direct DC power supply or incorporated into a system having a direct DC power source, like for example a flashlight or automobile which may use battery power, it may be unnecessary to use current limiting diodes. As such, when being powered with DC power, the circuits shown in FIGS. 13A-D may be substituted for any of the circuits shown in FIGS. 1-4 in any lighting device or system. Inasmuch as a direct DC power supply will provide substantially constant current, the need to limit or maintain the current at a substantially constant level is substantially lessened.

If, however, the DC power is rectified AC power, like for example from the mains, which will have a changing component as the AC power cycles, it may be advantageous to utilize a current limiting diode as shown, for example, in FIGS. 1-4. Utilizing the current limiting diode in the circuits will insure that the rectified DC current remains at a substantially limited level as the AC power cycles, protecting and extending the life of the LEDs as discussed herein.

When connecting any of the devices, circuits, chips, packages, or lamps shown in FIGS. 1-12 to DC power, only one half of the LEDs will emit light, while the remaining LEDs will be reversed biased and not operational. Using the example above, if LEDs 12, 22 in FIG. 1 are forward biased and LEDs 14, 20 are reverse biased or LED 72 is forward biased and LED 74 in FIG. 4 is reverse biased, LEDs 14, 20 and LED 74 will remain off and unused as long as they are reverse biased.

In order to use these LEDs and maximize the lifespan of the circuit, chip, package, lamp or bulb, device or system, it is contemplated by the invention that the polarity of the DC power applied to the circuit, chip, package, lamp or bulb, or device may be reversed to forward bias the previously reverse biased LEDs. Reversing the polarity of the provided DC power will cause the previously reverse biased LEDs to enter into a forward biased state, causing the previously reversed biased and unused LEDs to emit light. The essentially creates a circuit, chip, package, lamp, device or system which has twice the life of an ordinary DC powered LED light as it contains essentially two light emitting elements or circuits within a single circuit, chip, package, lamp, device or system—the first circuit being the first set forward biased LED(s) and the second circuit being the first set of reverse biased LED(s).

In order to take full advantage of this aspect of the invention when utilizing the circuits shown in FIGS. 1-3 for example, it may be desirable to replace the current limiting diode 30 in cross-connecting branch 28 with a common wire. Putting a common wire between the first and second branch junctions will eliminate the possibility the current limiting diode will burnout long before the previously reversed biased LEDs become forward biased after the polarity of the DC power is reversed across the circuit. Inasmuch as the cross-connecting branch must conduct current, i.e. be forward biased, both before and after the DC power polarity is reversed, the lifetime of any type of diode in the cross-connecting circuit will be substantially less than the initially reverse biased diodes once the polarity is reversed.

In order to reverse the DC power provided to the LEDs, where a chip, package, lamp or other device that utilizes power connection leads to establish a clear polarity connection to a power supply, like for example the lamps shown in FIGS. 12A, 12B, 12D and 12E, it is contemplated that the chip, package, lamp or other device may simply be manually disconnected from the DC power source to which it is attached, or from the device or system into which it is incorporated, and reconnected in the reverse polarity configuration. For example, the power connection lead 150, 152 in FIG. 12A, 12B, 12D, or 12E that was initially connected to the negative terminal or ground of the provided DC power may simply be connected to the positive terminal of the DC power source in order to forward bias the previously reversed biased LED(s). Such reversal may be done, for example, in automobile head lights, tail lights or brake lights, or a light within a battery powered hand held lighting device like a flashlight or a lantern by disconnecting the lamp or bulb and replacing it in a reverse fashion.

Rather than have to remove the bulb, chip, package, circuit or device, it is contemplated by the invention that the device or system into which the circuit(s) is incorporated may include a switch or the like capable of connecting the DC power to the load in both a “positive” and a “negative” polarity where “positive” polarity forward biases at least a first LED and reverse biases at least a second LED, and “negative” polarity forward biases at least the second LED and reverses biases at least the first LED. A switch embodiment may be realized as simply as controlling two pairs of switches or relays controlled by a manual external switch, each pair having a switch or relay connected to an opposite end of the circuit, or by using a double pole double throw (DPDT) switch with an off position. Moving the manual external switch to a first position may close a first pair of switches or relays which will create the “positive” polarity while moving the manual external switch to a second position will close a second pair of switches or relays which will create the “negative” polarity. When the first pair of switches or relays are closed the second pair of switches or relays will remain open and vice versa. A third switch position or an off position may leave both pairs of switches or relays open, allowing both the at least first and the at least second LEDs to be off.

When utilizing a switch, if the forward biased LEDs fail and stop emitting light within the device or system, the switch may be moved to a secondary position, or a reverse position, to reverse the polarity of the DC power provided to the LED circuit and forward bias the previously reverse biased LED(s). It is contemplated that during operation, the switch may be moved to any position, allowing either set of LED(s) to be forward biased without waiting for one set to fail. For example, a flashlight may be provided with a switch that when pushed forward from an off position will forward bias a first LED or string of LEDs and reverse bias a second LED or string of LEDs, and when pushed forward further to a second position or backwards from an off position will forward bias the second LED or string of LEDs and reverse bias the first LED or string of LEDs.

Rather than manually switch the circuit, chip, package, lamp, device or system by disconnecting it or using a switch, it is contemplated by the invention that the lighting device or system may include a sensor to monitor or “sense” the load (the circuit or device) and determine whether the circuit (i.e. the forward biased LED(s)) are operational and conducting current. If the sensor determines that the forward biased LED(s) (i.e. the load) is not operational and providing a voltage and/or current, using a signal provided (or not provided) to TTL logic gates, devices or circuits or a microcontroller may control a switch, relay or other circuitry to reverse the polarity of the DC power dynamically and forward bias and the previously reverse biased LED(s). For example, a sensor within the device or system may detect that the forward biased LED(s) are no longer conducting current and provide a signal (or stop providing a signal) to a TTL logic gate or circuit or a microcontroller which may cause a DPDT relay to dynamically change the polarity of power provided to the at least one circuit. The DPDT switching the polarity of the power will cause the previously reverse biased LED(s) to become forward biased and emit light.

Figure 14:
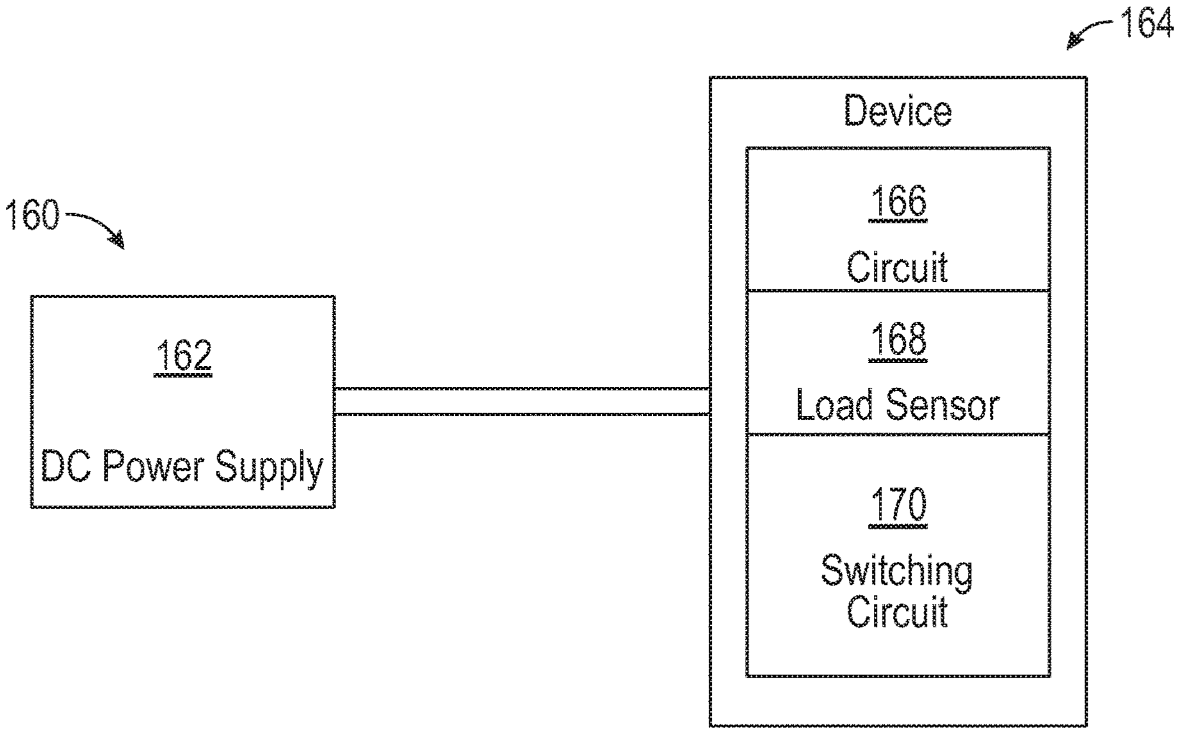
FIG. 14 shows a lighting system as contemplated by the invention.

One example of how a device with an internal sensor and dynamic polarity reversing can be seen in FIG. 14. As seen in FIG. 14, System 160 may include a DC power supply 162 connected to device 164 which includes circuit 166 which may be any circuit discussed herein. In order to detect the operation of the currently forward biased LED(s), load sensor 168 may be included within device 164. So long as load sensor 168 detects that the forward biased LEDs are operational, i.e. conducting current and/or voltage, the polarity of the power provided by the DC power supply will remain the same, and the forward biased diodes will be used to emit light. Once load sensor 168 fails to detect an output from the forward biased LED(s) in circuit 166 (i.e. the LED(s) burnout), load sensor 168 will trigger polarity switching circuit 170 which may include any required logic gates, circuitry or devices, any switches or relays, and/or any other required circuitry, to reverse the polarity of the DC power provided to circuit 166 so that the previously reverse biased LED(s) may be forward biased and begin emitting light. Once the load sensor fails to detect an output from the previously reversed biased LEDs, the lighting device is defective and needs to be replaced.

Figure 15:
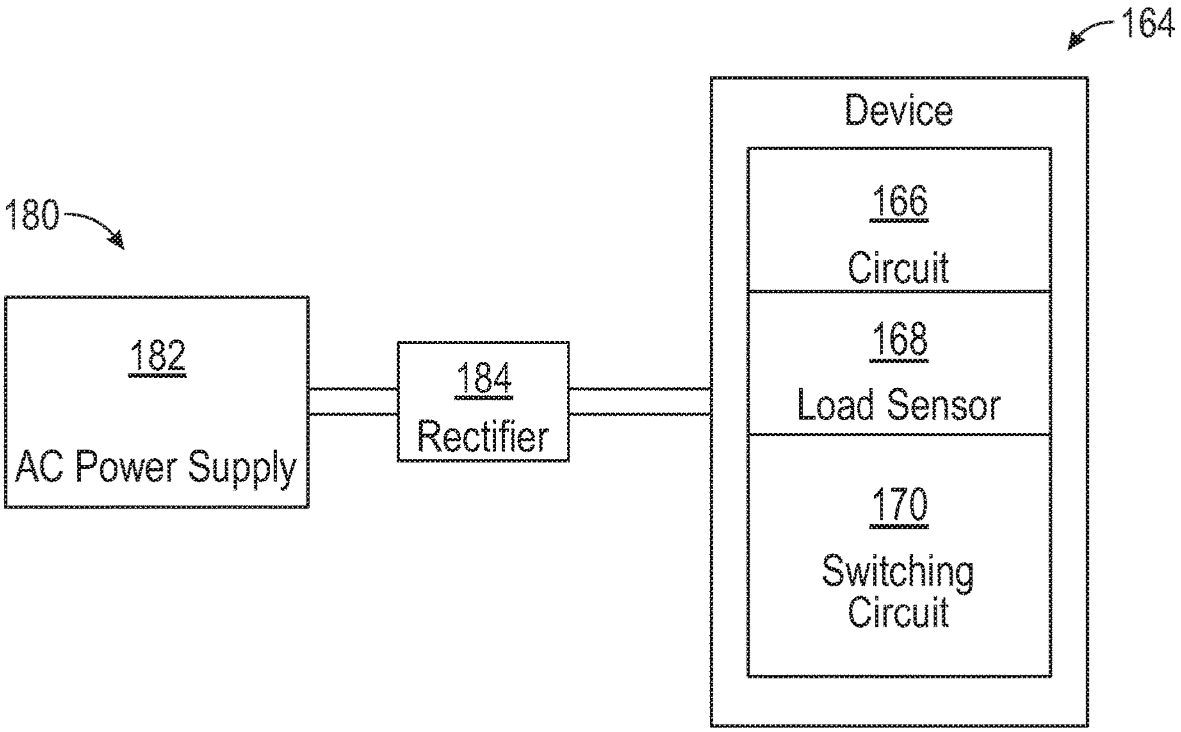
FIG. 15 shows a lighting system as contemplated by the invention.
Figure 16:
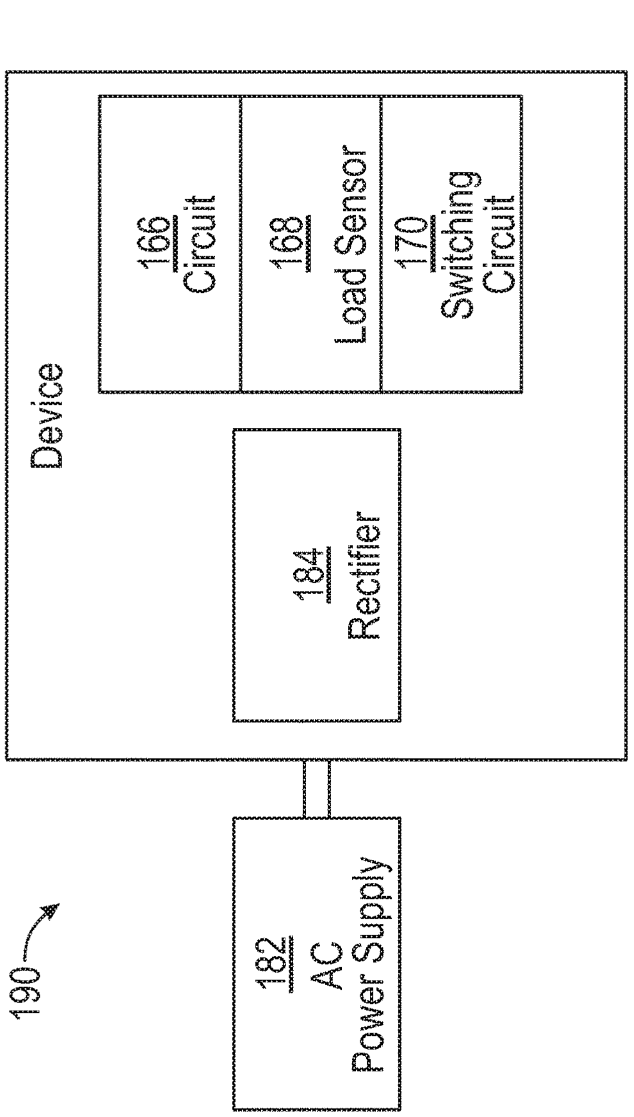
FIG. 16 shows a lighting system as contemplated by the invention.

FIGS. 15 and 16 show alternative embodiment systems 180 and 190 where DC power supply 162 is replaced with an AC power supply 182 and bridge rectifier 184 is used to provide DC power to the device or circuit. As seen in FIG. 15, system 180 may include bridge rectifier 184 which is located external of device 164, between AC power supply 182 and device 164. The AC power provided by AC power supply 182 may be provided to rectifier 184, and the rectified DC power may then be provided on to device 164. Alternatively, as seen in FIG. 16, bridge rectifier 182 may be located internally within device 164. In such embodiments, AC power would be received by device 164 and rectified by rectifier 182 before being provided as DC power to circuit 166.

Figure 17:
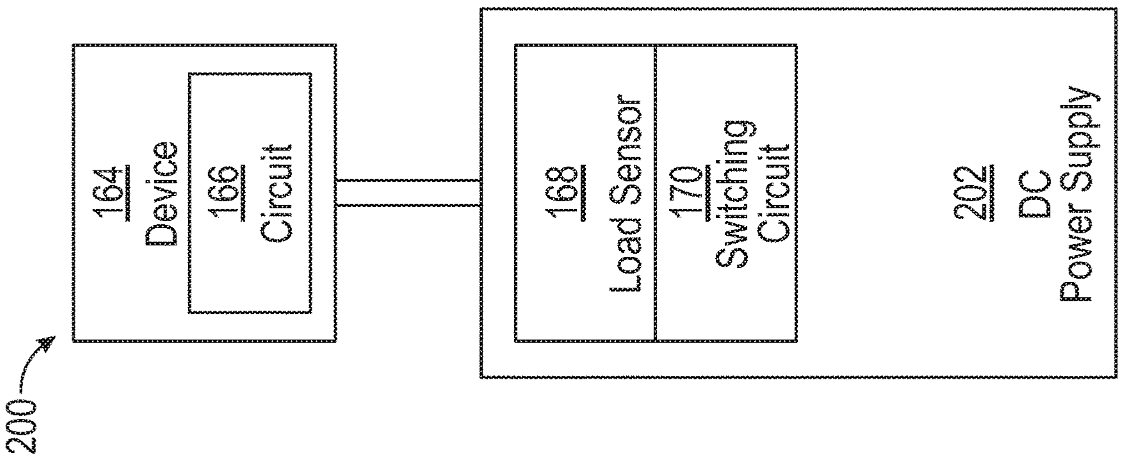
FIG. 17 shows a lighting system as contemplated by the invention.

FIG. 17 shows yet another embodiment, system 200. In system 200, DC power supply or driver 202 may include load sensor 168 and polarity switching circuit 170 internally. The feedback from device 164 may be used to determine whether the forward biased LED(s) in circuit 166 are operational. If the forward biased LED(s) fail, polarity switching circuit 170 may be triggered, and the polarity of the DC power provided to device 164 may be reversed.

Load sensor 168 and polarity switching circuit 170 may be provided within device 164 as a driver, with any additional circuitry required to efficiently drive circuit 166. For example, a driver within device 164 may include bridge rectifier 184 when necessary, as well as any step-up or step-down transformers to adjust an incoming AC voltage. In devices like those show in FIGS. 12A-12E, the driver circuitry may be located within the base (see for example base 210 in FIGS. 12A-E) or housing (see for example housing 156 in FIGS. 12A-E) and integrated in any manner known in the art. The driver may be, for example, a package or chip having any necessary components to connect to the power connection leads of the device and/or any connection leads required to connect to any circuits, chips or packages discussed herein.

While in the foregoing there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

What is claimed is:

1. A lighting system comprising:

a driver integrated circuit, wherein the driver integrated circuit has a load sensor, and wherein the driver integrated circuit provides a DC output;

at least one LED circuit having at least two LEDs, wherein the at least one LED circuit is electrically configured so that a first LED in the at least one LED circuit is electrically connected to and forward biased by the driver integrated circuit and a second LED in the at least one LED circuit is electrically connected to and reverse biased by the driver integrated circuit, and wherein the load sensor is configured to detect when the first LED fails to provide a voltage output while being forward biased by the driver integrated circuit; and a switching circuit capable of switching the DC output of the driver integrated circuit to forward bias the second LED in the at least one LED circuit, wherein the driver integrated circuit is configured to cause the switching circuit, without intervention from a user, to switch the DC output to forward bias the second LED and reverse bias the first LED after the load sensor detects the first LED is not operating.

2. The lighting system of claim 1, wherein the driver integrated circuit receives a DC voltage input from a battery.

3. The lighting system of claim 1, wherein the at least two LEDs are connected in a series or parallel configuration.

4. The lighting system of claim 1, wherein the DC output of the driver integrated circuit is at least one of a constant DC voltage or a constant current DC output.

5. The lighting system of claim 1, wherein the driver integrated circuit controls a current in at least one of the at least two LEDs.

6. The lighting system of claim 1, further comprising: at least one current limiting diode that is electrically coupled to cathodes of the first LED and the second LED.

7. The lighting system of claim 1, wherein the switching circuit switches the DC output of the driver integrated circuit by reversing a polarity of the DC output provided by the driver integrated circuit through a disconnection of the second LED from the DC output and reconnecting the second LED to the DC output in a reversed configuration so that the second LED that was previously reverse biased is now forward biased.

8. A lighting system comprising:

at least one circuit having at least two LEDs, the at least two LEDs electrically connected and configured so that when the at least two LEDs are connected to a driver integrated circuit, a first LED within the at least one circuit is forward biased by the driver integrated circuit and a second LED within the at least one circuit is reversed biased by the driver integrated circuit, wherein the driver integrated circuit includes a load sensor that is configured to detect when the first LED fails to output a forward voltage or a current, wherein the driver integrated circuit further includes a switching circuit capable of dynamically adjusting an output of the driver integrated circuit when the load sensor detects that the first LED has failed, and wherein the driver integrated circuit is configured to cause the switching circuit to switch the output to forward bias the second LED and reverse bias the first LED after the load sensor detects the first LED has failed.

9. The lighting system of claim 8, wherein the lighting system is incorporated in an automobile.

10. The lighting system of claim 8, wherein the driver integrated circuit receives a DC voltage input from a battery.

11. The lighting system of claim 8, wherein the at least two LEDs are connected in a series or parallel configuration.

12. The lighting system of claim 8, wherein a DC output of the driver integrated circuit is at least one of a constant DC voltage or a constant current DC output.

13. The lighting system of claim 8, wherein the switching circuit dynamically adjusts the output of the driver integrated circuit by reversing a polarity of a DC output provided by the driver integrated circuit through a disconnection of the second LED from the DC output and reconnecting the second LED to the DC output in a reversed configuration so that the second LED that was previously reverse biased is now forward biased.

14. A lighting system comprising:

a driver integrated circuit configured to provide a voltage output, the driver integrated circuit including a load sensor;

an LED circuit electrically connected to the driver integrated circuit, the LED circuit including at least two LEDs and a current limiting diode, wherein the LED circuit is electrically configured so that a first LED is electrically connected to and forward biased by the driver integrated circuit, a second LED is electrically connected to and reverse biased by the driver integrated circuit, and the current limiting diode forms a cross-connecting circuit branch for the first LED and the second LED, and wherein the load sensor is configured to detect when the first LED fails to provide a voltage output while being forward biased by the driver integrated circuit; and a switching circuit configured to switch the voltage output of the driver integrated circuit to forward bias the second LED when the load sensor detects that the first LED is not operating, wherein the driver integrated circuit is configured to cause the switching circuit to switch the voltage output to forward bias the second LED and reverse bias the first LED after the load sensor detects the first LED is not operating.

15. The lighting system of claim 14, wherein the voltage output of the driver integrated circuit is at least one of a constant DC voltage or a constant current DC output.

16. The lighting system of claim 14, wherein the switching circuit dynamically adjusts the voltage output of the driver integrated circuit by reversing a polarity of the voltage output provided by the driver integrated circuit through a disconnection of the second LED from the voltage output and reconnecting the second LED to the voltage output in a reversed configuration so that the second LED that was previously reverse biased is now forward biased.

17. The lighting system of claim 14, wherein the driver integrated circuit receives a DC voltage input from a battery.

18. The lighting system of claim 14, wherein the at least two LEDs are connected in a series or parallel configuration.

19. The lighting system of claim 14, wherein the driver integrated circuit controls a current in at least one of the at least two LEDs.

20. The lighting system of claim 14, wherein an anode of the current limiting diode is electrically coupled to cathodes of the first LED and the second LED.

* * * * *